(12) United States Patent
Allen et al.

(10) Patent No.: US 8,914,773 B2
(45) Date of Patent: Dec. 16, 2014

(54) LOGIC TABLE

(75) Inventors: Michael W. Allen, Bloomington, MN (US); Steven M. Birth, Minneapolis, MN (US); Jesse L. Coyle, Maple Grove, MN (US)

(73) Assignee: Allen Learning Technologies, Mendota Heights, MN (US)

( * ) Notice: Subject to any disclaimer, the term of this patent is extended or adjusted under 35 U.S.C. 154(b) by 197 days.

(21) Appl. No.: 13/701,348

(22) PCT Filed: Jun. 2, 2011

(86) PCT No.: PCT/US2011/038932
§ 371 (c)(1),
(2), (4) Date: Nov. 30, 2012

(87) PCT Pub. No.: WO2011/153352
PCT Pub. Date: Dec. 8, 2011

(65) Prior Publication Data
US 2013/0074034 A1    Mar. 21, 2013

Related U.S. Application Data

(60) Provisional application No. 61/350,867, filed on Jun. 2, 2010, provisional application No. 61/410,033, filed on Nov. 4, 2010.

(51) Int. Cl.
| G01P 5/00 | (2006.01) |
| G01P 7/00 | (2006.01) |
| G01P 11/00 | (2006.01) |
| G06F 15/16 | (2006.01) |
| G06F 3/00 | (2006.01) |
| G06F 3/048 | (2013.01) |
| G05B 15/00 | (2006.01) |
| G05B 19/00 | (2006.01) |

(52) U.S. Cl.
USPC .......... 717/109; 702/142; 709/203; 715/708; 715/763; 700/259

(58) Field of Classification Search
CPC .................. G06F 17/30306; G06F 17/30247; G06F 17/30572; G06F 17/30575; G06F 21/6227; G06F 2221/2145; G05B 19/05; G05B 19/4147; G05B 2219/13017; G05B 2219/14085; G05B 2219/14086
See application file for complete search history.

(56) References Cited

U.S. PATENT DOCUMENTS

| 4,703,317 | A | * | 10/1987 | Shiomi et al. ................... 345/24 |
| 5,848,291 | A |   | 12/1998 | Milne et al. |
| 5,889,519 | A |   | 3/1999  | Boezeman et al. |
| 6,169,966 | B1 | * | 1/2001 | Miura et al. .................. 702/142 |
| 7,162,056 | B2 | * | 1/2007 | Burl et al. ...................... 700/259 |
| 2002/0178135 | A1 | * | 11/2002 | Tanaka ............................. 707/1 |
| 2005/0027666 | A1 | * | 2/2005 | Beck et al. ........................ 707/1 |
| 2008/0104556 | A1 | * | 5/2008 | Yamada ............................ 716/5 |
| 2008/0244423 | A1 | * | 10/2008 | Jensen-Pistorius et al. .. 715/763 |
| 2008/0270978 | A1 |   | 10/2008 | Leung |
| 2009/0150779 | A1 | * | 6/2009 | Kodama et al. ............... 715/708 |
| 2010/0030845 | A1 | * | 2/2010 | Junghans et al. ............. 709/203 |

* cited by examiner

*Primary Examiner* — Don Wong
*Assistant Examiner* — Anibal Rivera
(74) *Attorney, Agent, or Firm* — Hamre, Schumann, Mueller & Larson, P.C.

(57) ABSTRACT

The disclosed logic tables include a truth table, an answer table and a state table. The logic tables enable integration of conditional logic, complex situational judging, and state handling using an elegant, visual set of tools with a consistent graphical user interface. The user is able to create logical interactions between objects which would otherwise require the use of a complex computer programming language.

10 Claims, 13 Drawing Sheets

ANSWER TABLE
600

| Answer Table | | | Now | 1 | 2 | 3 | 4 | 5 |
|---|---|---|---|---|---|---|---|---|
| Ready (1) | ? | | F | ✓ | ↻ | → | ↗ | → |
| Guage: | number | = 50 | T | ✓ | 1 | ✓ | 1-1(2) | ✓ |
| " | number | = 75 | T | | ✓ | ✓ | 1-2(2) | |
| Ques1: | response | = cat \| dog \| bird | 20 | 21 | 22 | 23 | 24 | -500 |
| Points | | = col + 20 | 11 | 11 | 11 | 11 | 30 | 335 |
| Super Points | | = Points + 5 | 1 | 3 | 2 | 3 | 3 | 2 |
| Feedback pages | | = | # | | | | | |
| Text teedback | | = | | incorrect | great | not bad | improv.. | You're ou.. |
| Move Marker | | = | | | | | | |
| Color Feedback | | = | | 3 | 10 | 5 | 5 | 1 |
| ▼ Tween...... | | | | 32 | 30 | 15 | 10 | 9 |
| Secs - transition.. | | | | | | | | |
| Secs - hold....... | | | | | | | | |

Fig. 6A

ANSWER TABLE - SEQUENCE NOTATION the Answer Table evaluates on the basis of expressions and sequence.

An incoming property must be both TRUE... and it must be done in the CORRECT SEQUENCE.

The Sequence Notation is typed into the Logic Cells.

This page shows the notation protocol... and example cases.

CASE EXAMPLES

| 1 | 2 | 3 | 4 | 5 | 6 | 7 | 8 | 9 | 10 | 11 |
|---|---|---|---|---|---|---|---|---|---|---|
| ✓ | 3 | 3 | | | | | | | | |
| | | | 1 | 1-1 | 1 | 1(2) | 1-2(2) | 1 | a1 | a1 |
| ✓ | 1 | 1 | 1 | 1-2 | 2 | 1(2) | 1-1(2) | 1 | a2 | a2 |
| ✓ | 2 | 2 | 1 | 1-3 | 3 | 1(2) | 1-3(2) | 1 | a3 | a3 |
| | | | 1 | 1-4 | 4 | 1(2) | 1-4(2) | | a4 | a4 |
| ✓ | 4 | ✓ | | | | | | 2a(2) | | |
| ✓ | 5 | ✓ | 2 | | 2 | 5 | | 2 | 2a(2) | c |
| | | | ✓ | 2 | 2 | 5 | | 2 | 2a(2) | c |
| ✓ | | | | | | | | 2a(2) | | |
| | | | 3 | | 3 | 6 | 3(1) | 3 | b1 | b1 |
| | | | 3 | | 3 | 6 | 3(1) | 3 | 2b(1) | b2 |
| | | | 3 | | 3 | 6 | 3(1) | 3 | 2b(2) | b1 |
| | | | | | | | 3(1) | | | |
| | | | | | | | 3(1) | | 3 | |
| | | | | | | | | | 3 | |

CASE DESCRIPTIONS:

COLUMN 1: - Non-sequential checkmark:
Rows are marked with checkmarks.
All marked rows must be true in any order.
(See column 1 example.)

COLUMN 2: 1, 2, 3- Sequential Numbers:
All rows with numbers must be true in the order of the numbers. The numbers can be in any order in the column... Judging looks only at the numerical sequence.

COLUMN 3: Combination of Non-sequential and Sequential:
Rows with a number must be done in the sequence. Those with a check, can be done at any time.

COLUMN 4: Sequential Groups with Non-Sequential Steps:
All rows marked with "1" are a group that must be done before the "2" and "3" groups. Within each group, the rows can be done in any order, because no sequence is indicated within the group.

COLUMN 5: Sequential Groups with Sequential Steps:
All rows marked with "1" are a group that must be done before the "2" and "3" groups. But within Group 1, there are 4 steps that must be done in sequence.

CASES: continued

COLUMN 6: Alternate notation:
This is another way to notate the sequence in COLUMN 5. Instead of using a 1-1 to 1-4 notation, the group of "1's" are notated as 1, 2, 3, 4... and the "2's" are changed to "5's", etc..

COLUMN 7: Sequential Groups with Non-Sequential Steps with Subset Choices:
Parentheses indicate a choice range. So in this example, within the "1" group, only 2 of the "1's" have to be completed before advancing to the "2's". All of the "2's" must be done in any order. But within the group of "3's", only 1 item has to be completed out of the group of 5 items.

COLUMN 8: Sequential Groups with Sequential Steps with Subset Choices:
In the "1" group, the 4 steps must be done in order, 1-1 to 1-4... but only 2 of the steps need to be completed. For example, a user could complete either 1-1 and 1-3... or 1-3 and 1-4, etc to complete this group. Then they would advance to groups 2 and 3.

COLUMN 9: Sequential Groups with Non-Sequential Sub-Groups with Subset Choices:
This case uses letters to say "non-sequential". In this example:
-Group 1 must done first. The steps within Group 1 can be done in any order.
-Group 2 must be done secondly. Within Group "2", there are two subgroups "a" and "b". Either group can be done in any order, but both groups must be done before doing Group 3. Within Groups "2a", only 2 items "(2)" must be completed. Within Group "2b", only 1 item "(1)" must be completes.
-Group 3 must be done last.

COLUMN 10: Non-sequential Groups with both Sequential and Non-Sequential Sub-Groups:
This cases uses letters to say "non-sequential." In this example:
-Groups A, B, C, can be done in any order,
-Within Group A, four steps must be done together, and in order.
-Within Group B, three steps must be done together, and in oder.
-Group C has two steps that must be done together, but in an order.

COLUMN 11: Variation on COLUMN 10:
This is the same as COLUMN 10, but the steps that were formally in Group C, now can be done at any time. They do not need to be done together as a group.

*Fig. 6B*

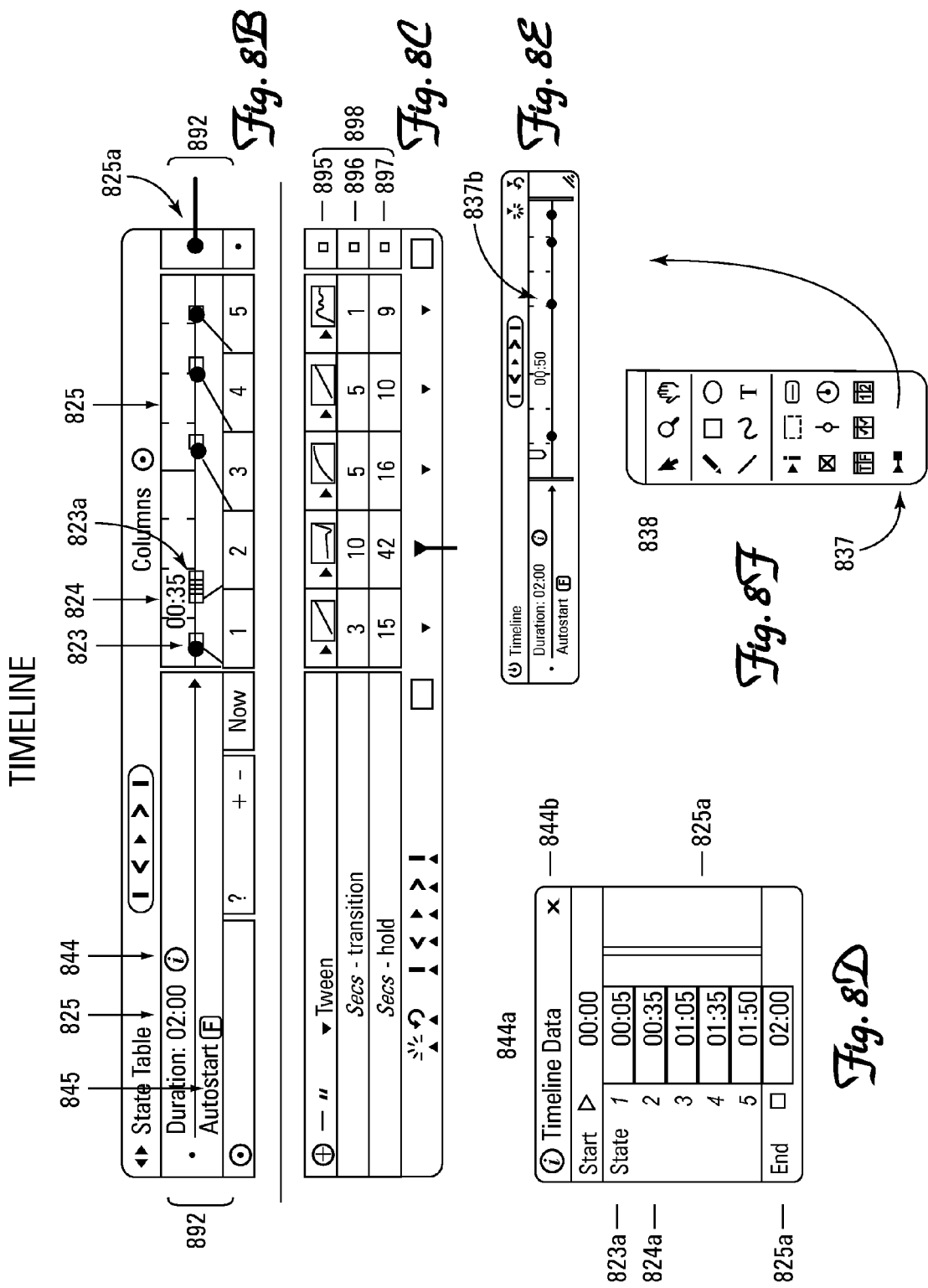

LOGIC TABLE

FIELD

This disclosure relates generally to a program product for developing multimedia computer applications, and in particular to a program product for allowing a computer apparatus to link program objects using a logic table as a program object.

BACKGROUND

In general, decision tables contain a list of decisions and the criteria on which they are based. In computer programming, decision tables are used to direct processes according to decisions made in different situations. A decision table can be quite complex, especially where many decisions are involved to account for all possible situations. It is generally accepted that although visual programming environments are user friendly, they tend to fail to address the need for creators of interactive media to build interactions which depend on complex decision making such as those involved with decision tables. Thus, the solution tends to be a "scripting" functionality where the creator needs to use programming.

SUMMARY

A visual set of tools and methods for enabling integration of conditional logic, complex situational judging and state handling are described.

In one aspect of the disclosure, logic tables as program objects are created within a graphical user interface (GUI) system. The use of logic tables as program objects allow for sophisticated evaluation and manipulation of objects and properties such that a user can create applications using decision tables with a high degree of complexity without having to learn complex computer programming languages such as Java, C++, etc.

The disclosed logic tables include a truth table, an answer table and a state table. The logic tables enable integration of conditional logic, complex situational judging, and state handling using an elegant, visual set of tools with a consistent graphical user interface. The user is able to create logical interactions between objects which would otherwise require the use of a complex computer programming language.

BRIEF DESCRIPTION OF THE DRAWINGS

FIGS. 6A-B illustrate one embodiment of an Answer Table as a logical object.

FIG. 8A-F illustrate one embodiment of a State Table as a logical object.

Like reference symbols in the various drawings indicate like elements.

DETAILED DESCRIPTION

Figure 1:
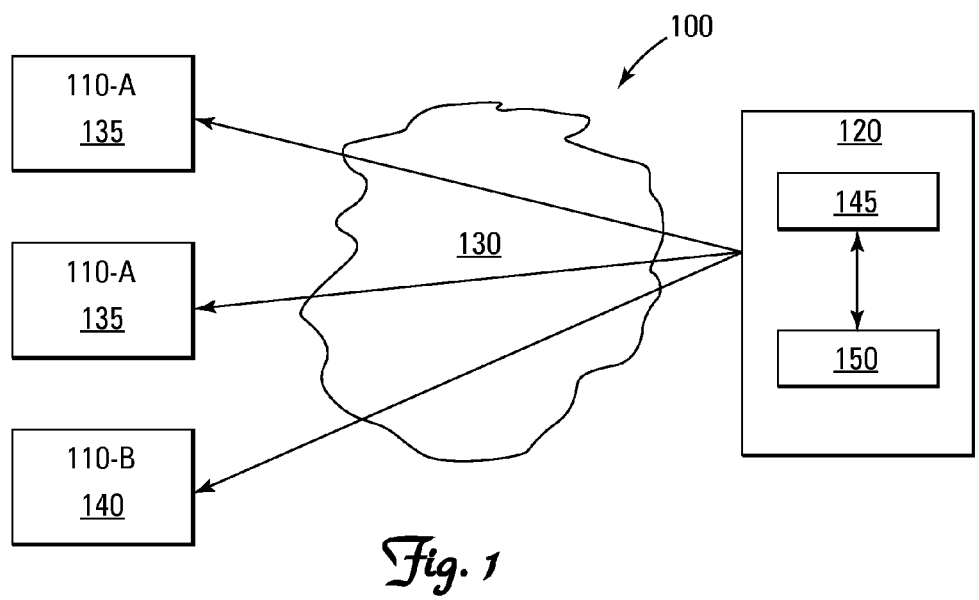
FIG. 1 is a high-level schematic of a system for providing a combined programming and running implementation for creating a multimedia computer application.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The term "multimedia computer application" (i.e., project) is used herein to refer to an executable program that is capable of outputting from a computer one or more sensory stimuli (i.e. visual, audial, tactile, etc.) allowing a user to perform singular or multiple related specific tasks. The term "editing" is used herein to refer to creating a new multimedia computer application, modifying an existing multimedia computer application, and/or interacting with an existing multimedia computer application.

The term "program" is used herein to refer to generally to a language having a form that a machine is configured to understand and/or follow. The term "debugging" is used herein to refer to a process for detecting and locating program faults for fixing faults in a program. The term "programming language" is used herein to refer to an artificial language for expressing computations, algorithms, and logic for directing a machine to perform a particular function and/or action. The term "compiler" is used herein to refer to a computer program that transforms the written source code into machine language that can be executed by a computer processor. The term "object relational mapping" is used herein to refer to a programming technique for converting data between incompatible type systems in object-oriented programming languages.

The term "asset" is used herein to refer to any image, audio, video, text, SWF (Shockwave Flash), XML (Extensible Markup Language) or other external multimedia formats used in the multimedia computer application. The term "object" is used herein to include, but are not limited by, a primitive object, a container object, and/or an interactive object. The term "primitive object" is used herein to describe a single object, such lines, curves, and/or other basic as geometric shapes. The term "container object" is used herein to describe an object that can contain one or more other objects. Examples include, but are not limited by, an arena object and/or a gadget object. A container object can contain any of the other objects. The term "interactive object" is used herein to describe an object that is configured for interaction with a user, wherein the visual representation of the object is changeable upon the interaction with the user. Examples include a slider object and/or a path object. A primitive object having certain properties can be an interactive object, if the visual representation of the primitive object is changeable upon the interaction with the user.

The term "tool" is used here in to describe a function for selecting, creating, and/or manipulating an object. The term "tool box" is used herein to describe a visual representation displaying one or more tool icons. The term "tool icon" is used herein to describe a graphical pictogram that represents a tool, that is displayed on a screen of a display device. The tool icon may be clicked and/or selected by a user interacting with the GUI to activate a tool associated with the selected tool icon for selecting, creating, and/or manipulating an object.

The term "application data" is used herein to refer to the current state of the multimedia computer application. The term "project data" is used herein to refer to the serialized aggregate of all objects, all interactions between the objects, and all assets used in the multimedia computer application.

The term "graphical user interface" (i.e., GUI) is used herein to refer to a type of user interface that generally offers visual indicators that can be manipulated by a user for performing actions (such as, for example, select commands, call up files, start programs, and do other routine tasks) as opposed to having to type in text commands.

The term "programming environment" is used herein to refer to software run on a computer processor which allows the use of programming expressions (such as written code, graphics, drawings, animation or icons) in the process of programming a multimedia computer application. The term "runtime environment" is used herein to refer to software run on a computer processor which allows a user to run (i.e. sending instructions to the computer's processor and accessing the computer's memory (RAM) and other system resources) an executed multimedia computer application. The term "real-time collaboration" is used herein to refer to software run on a computer processor which allows several people to concurrently edit a multimedia computer application using different computers. The term "single combined programming and runtime implementation" is used herein to refer to software run on a computer processor which allows a user to use programming expressions (such as written code, graphics, drawings, animation or icons) in the process of programming a multimedia computer application and concurrently allows a user to run (i.e. sending instructions to the computer's processor and accessing the computer's memory (RAM) and other system resources) an executed multimedia computer application.

Methods for associating program objects using a logic table as a program object are described. A multimedia computer application, as defined herein, is directed to a computer program that is a complete interactive experience that is capable of performing singular or multiple related specific tasks. Objects, as discussed herein, refer to primitive, logical and interactive data structures consisting of data fields and methods together with their interactions.

An interactive object, as defined herein, refers to an object that that can be made up of other interactive objects, primitive objects, and/or logical objects. In some instances an interactive object may be a separate multimedia computer application that is being used to perform a function within a larger multimedia computer application.

A project, as discussed herein, includes at least one selected from a decoded version of a multimedia computation application, an object, an asset or a resource, and combinations thereof.

Assets or resources, as discussed herein, refer to any image, audio, video, text, SWF (Shockwave Flash), or XML (Extensible Markup Language) used in the multimedia computer application. Application data, as discussed herein, refers to the current state of the multimedia computer application. Project data, as discussed herein, refers to the serialized aggregate of all objects, all interactions between the objects, and all assets used in the multimedia computer application.

FIG. 1 is a high-level schematic of a system 100 for providing a combined programming and running implementation for creating, modifying and/or interacting with a multimedia computer application, according to one embodiment. The system 100 includes a plurality of user terminals 110-A and 110-B, a back end server 120, and a network 130. The user terminals 110-A and 110-B communicate with the back end server 120 via the network 130.

The user terminals 110-A and 110-B allow a user to create a multimedia computer application that is stored in the back end server 120 and to modify and/or interact with the multimedia computer application via the network 130. The user terminals 110-A use a web browser 135 to create, modify and/or interact with a multimedia computer application hosted on back end server 120 via the network 130. The user terminal 110-B can use either a web browser 135 or a combined programming and running application 140 to create, modify and/or interact with a multimedia computer application hosted on the back end server 120 via the network 130. Regardless of whether the multimedia computer application is accessed via the web browser 135 or the combined programming and running application 140, the back end server provides a unified codebase to the user terminals 110-A and 110-B for a user to create, modify and/or interact with the multimedia computer application.

In some embodiments, a multimedia computer application can be stored in the user terminal 110-B and the back end server 120. In these embodiments, when the user terminal 110-B does not have access to the network 130, the user can still create, modify and/or interact with the multimedia computer application via the combined programming and running application 140. When the user terminal 110-B does connect to the network 130, any changes, modifications and/or interactions to the multimedia computer application can then be updated to the multimedia computer application stored in the back end server.

Also, in some embodiments the combined programming and running application 140 contains additional functionality over the web browser 135 including allowing the import of assets from the native operating system of the user terminal 110-B, providing advanced methods of exporting a multimedia computer application and its assets to the back end server 120, and, as discussed above, offline editing of the multimedia computer application. One example of an advanced method for exporting a multimedia computer application and its contents is to convert the multimedia computer application and its contents into a single zip file that can be seamlessly imported and unzipped by the combined programming and running application 140.

Figure 10:
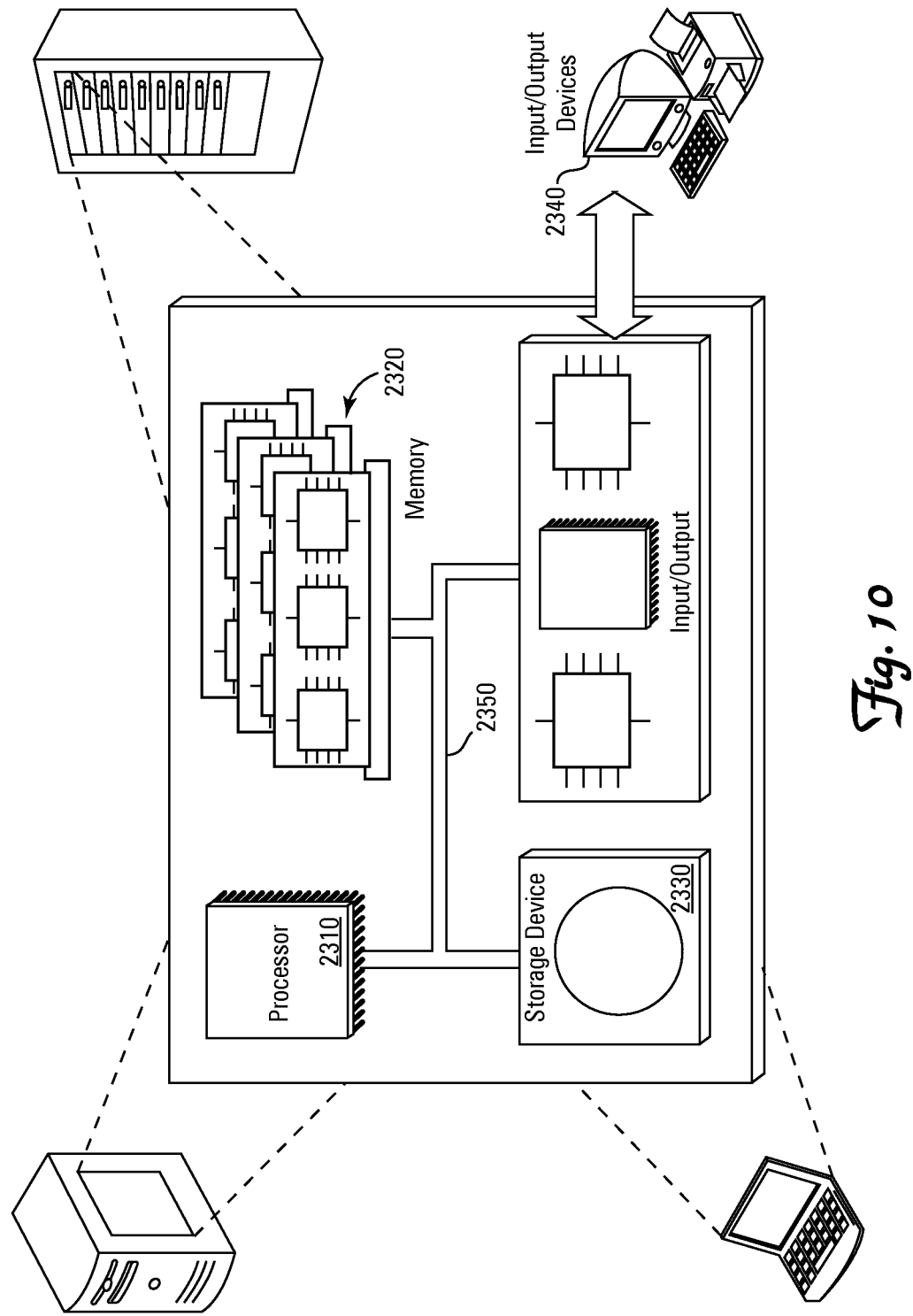
FIG. 10 is an example of a computing device that can be used to implement the systems and methods described herein.

In one embodiment, each of the user terminals 110-A and 110-B is a computing device, such as the computing device shown in FIG. 10. Examples of web browsers that can be used include, for example, Microsoft Internet Explorer, Mozilla Firefox, Apple Safari, etc.

The back end server 120 hosts the programming and runtime environments in a single combined programming and running implementation 145. The back end server 120 also stores multimedia computer applications and assets created or provided while using the combined programming and running implementation 145. The back end server 120 stores the created multimedia computer applications and the assets in a database 150.

In one embodiment, the network 130 is an Internet based network that allows any computing device with access to the Internet to access a particular multimedia computer application or asset through the single combined programming and running implementation 145. In another embodiment, the network 130 is an Intranet based network that allows only those communicating devices (i.e., user terminals 110-A and 110-B) that are granted secure access to the network 130 to access a particular multimedia computer application or asset through the single combined programming and running implementation 145.

Figure 2A:
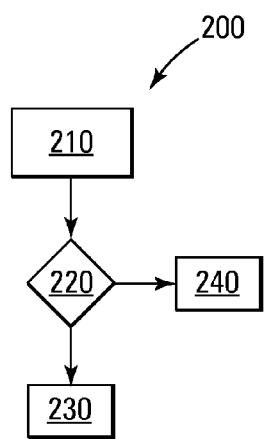
FIG. 2A is a flowchart of a process for providing a combined programming and running implementation for creating a multimedia computer application to a user via a web browser.

FIG. 2A is a flowchart 200 of a process for providing a user access to a combined programming and running implementation for creating a multimedia computer application via a web browser, according to one embodiment. The flowchart 200 begins at step 210, where a user terminal (such as the user terminal 110-A or 110-B shown in FIG. 1) connects to a back end server (such as the back end server 120 shown in FIG. 1) via a web browser (such as the web browser 135 shown in FIG. 1). After the user terminal successfully connects to the back end server via the web browser, the flowchart 200 proceeds to step 220.

At step 220, a user via the user terminal requests access to a particular multimedia computer application or requests to create a new multimedia computer application. The back end server determines whether the user terminal has the necessary access permission to access the multimedia computer application or create a new multimedia computer application. If the back end server determines that the user terminal has the necessary access permission, the flowchart 200 proceeds to step 230. If the back end server determines the user terminal does not have the necessary access permission to access the multimedia computer application or create a new multimedia computer application, the flowchart 200 proceeds to step 240. At step 240, the process ends.

The back end server can determine whether the user terminal has the necessary access permission based on different factors. For example, in some embodiments, the back end server checks whether the user terminal has provided correct password and login information to access a particular multimedia computer application or create a new multimedia computer application.

At step 230, if the user terminal requested a particular multimedia computer application, the back end server provides access to a front end portion of the combined programming and running implementation and to the particular multimedia computer application via the combined programming and running implementation. If the user requested to create a new multimedia computer application, the back end server provides the combined programming and running implementation for creating a multimedia computer application with a new multimedia computer application.

Figure 2B:
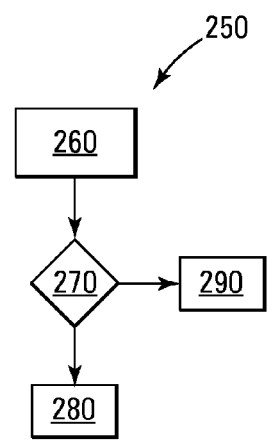
FIG. 2B is a flowchart of a process for providing a combined programming and running implementation for creating a multimedia computer application to a user via a combined programming and running software application stored on the user terminal.

FIG. 2B is a flowchart 250 of a process for providing a user access to a combined programming and running implementation for creating a multimedia computer application via a combined programming and running software application stored on the user terminal, according to one embodiment. The flowchart 250 begins at step 260, where a user terminal (such as the user terminal 110-B shown in FIG. 1) connects to a back end server (such as the back end server 120 shown in FIG. 1) via a combined programming and running software application (such as the combined programming and running application 145 shown in FIG. 1) stored on the user terminal. After the user terminal successfully connects to the back end server, the flowchart 250 proceeds to step 270.

At step 270, a user via the user terminal requests access to a particular multimedia computer application or requests to create a new multimedia computer application. The back end server determines whether the user terminal has the necessary access permission to access the multimedia computer application or create a new multimedia computer application. If the back end server determines that the user terminal has the necessary access permission, the flowchart 250 proceeds to step 280. If the back end server determines the user terminal does not have the necessary access permission to access the multimedia computer application, the flowchart 250 proceeds to step 290. At step 290, the process ends.

At step 280, if the user terminal requested a particular multimedia computer application, the back end server provides access to the particular multimedia computer application that can be modified and/or interacted with using a front end portion of the combined programming and running software application stored on the user terminal. If the user terminal requested to create a new multimedia computer application, the back end server provides a new multimedia computer application that can be modified using the combined programming and running software application stored on the user terminal.

The systems and methods illustrated in FIGS. 1, 2A and 2B can be used to edit a multimedia computer application while the multimedia computer application is running and to run a multimedia computer application while the multimedia computer application is being edited. The programming environment and the runtime environment described herein can have the same functionality. The programming environment and the runtime environment can provide real-time collaboration of a multimedia computer application between users in different geographical locations.

In some aspects of this disclosure, a graphical user interface (GUI) system is created by the single combined programming and running implementation 145. In one example, the GUI system is an environment on an image display of the user terminals 110-A and 110B implemented, for example, by a single combined programming and running implementation 145. In one instance, the GUI system is contained within the web browser 135.

In some embodiments, a multimedia computer application is created by a user when the GUI system is implemented. The multimedia computer application is modified by the single combined programming and running implementation 145 whenever any changes are made in the GUI system.

In some embodiments, the GUI system includes a window in which objects are arranged and a toolbox which enables a user to select a tool to create objects in the window. In one example, the toolbox includes a logic table as a type of tool. In one implementation, it is possible for a user to select the logic table as a tool from the toolbox and create a logic table as an object in the window.

In one instance, a "logic table" means a tool used to indicate the truth-value of a compound statement for every truth-value of its component propositions. The logic table can be used to indicate the value of an output of a logic provided in the table for every value of an input.

In one instance, the logical objects in the window are created by the single combined programming and running implementation 145 accessing an object library in a data structure of the database 150, and modifying the multimedia computer application. The objects created can include the disclosed logic tables. The disclosed logic tables include a truth table, an answer table and a state table.

Truth Table

Truth Table: Overview

Figure 3:
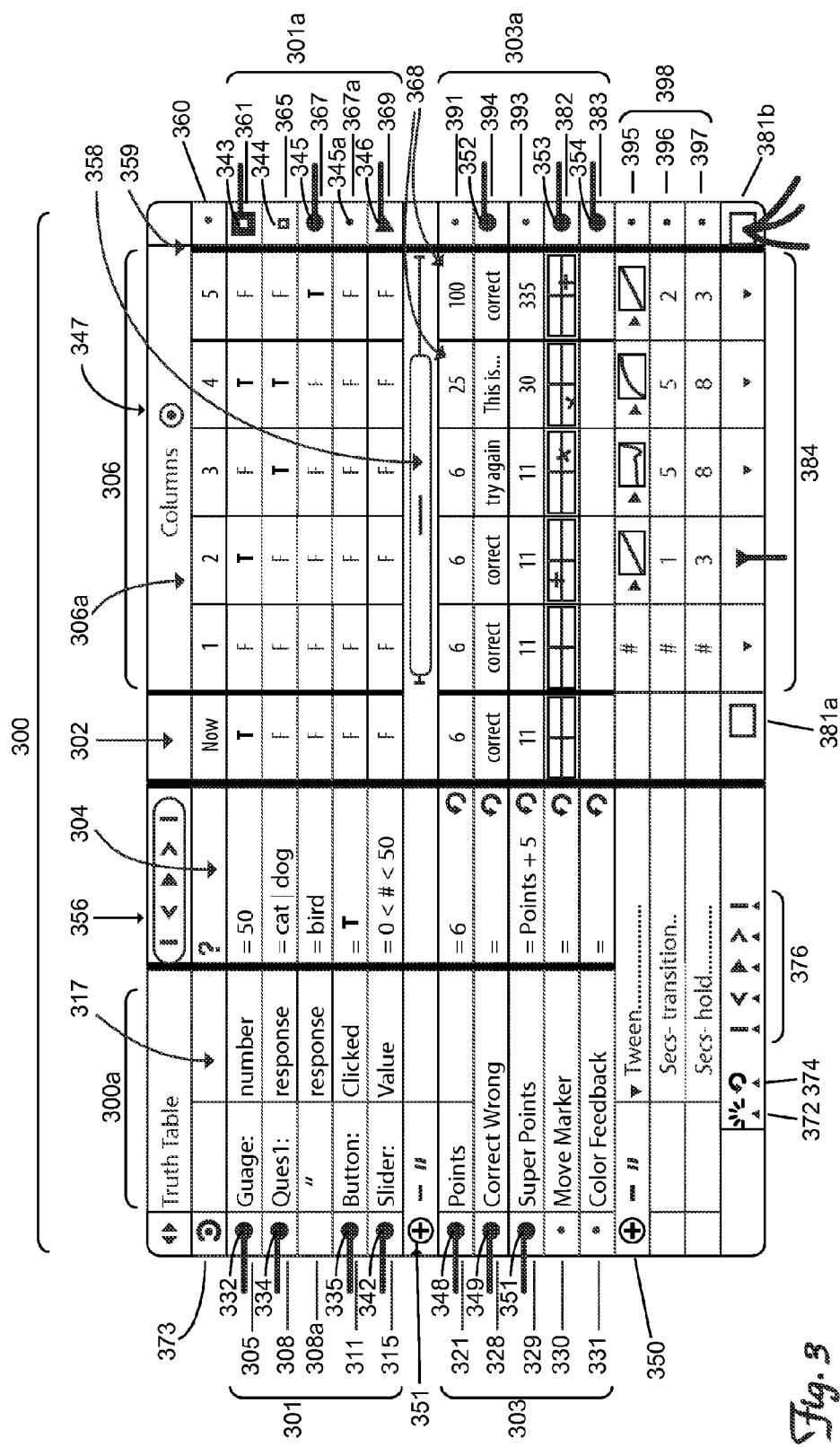
FIG. 3 illustrates one embodiment of a Truth Table as a logical object.

FIG. 3 shows one embodiment of the disclosed logic table that can be used as a program object. A table name row 300a identifies the type of the logic table 300. In the present embodiment, the logic table is a Truth Table 300 that allows a user to manipulate properties of objects within a multimedia computer application based on conditional logic and Boolean evaluation, which evaluates expressions as True (T) or False (F).

The Truth Table 300 includes logic rows 301, a name column 317, an expression column 304 and an associated data table 306.

Truth Table: Logic Rows

In the example shown in FIG. 3, five logic rows 305, 308, 308a, 311, and 315 are shown, but the number of logic rows is not particularly limited. The logic rows 301 include information regarding incoming properties such as the name of the incoming properties (name column 317), evaluation expressions 304, ditto rows 308a and associated data 306.

Truth Table: Property Name Column

The incoming properties are properties of a program object being wired. In the example shown in FIG. 3, the incoming properties are listed in the property name column 317 for logic rows 305, 308, 311, and 315, where each of the rows 305, 308, 311, and 315 includes an identifier or ribbon name of an incoming property of another object received as an input. For example, in the logic row 311 of the property name column 317, a ribbon name of a button program object is included. The button has a property "clicked", and the ribbon name of this property is displayed in the logic row 311 of the property name column 317.

Truth Table: Evaluation Expressions

The evaluation expressions are conditional statements of the wired properties. In the example shown in FIG. 3, the evaluation expressions are listed in the expression column 304 for the logic rows 305, 308, 311, and 315. In one example, each of the rows 305, 308, 311, and 315 includes an equal sign. The evaluation expressions are conditional logic statements that may include alpha or numeric values. In one example, the evaluation expressions default to "=50" (50=current value) as shown in the logic row 305 of the expression column 304. In some examples, the evaluation expression may include "greater than" or "less than" signs ("<", ">") as shown in the logic row 315 of the expression column 304. In other examples, the way that the numeric expression is displayed is not particularly limited, and may be "=<" or "=>" for "less than or equal to" or "greater than equal to", respectively. In yet in other examples, an expression can include the character "#". In this instance, the character "#" refers to the current value of the incoming property. For example, in the logic row 315 of the expression column 304, "=0<#<50" is displayed, which can be read as: If the current value (#) is "greater than zero" or "less than 50", the evaluation is True (T).

Truth Table: Ditto Rows

The logic row 308a is a ditto row, and is a repeat of a row directly above the logic row 308a. In FIG. 3, logic row 308a is a repeat of the logic row 308, which has the name "Ques 1: response". By way of an example of how a ditto row is created, a logic row is first created when a property ribbon within a program object is wired to an "Add Logic Row" button. The ditto row is then created when the same property ribbon within the program object is wired to the previous logic row. In the present example, the logic row 308 is created when the ribbon "Response" in the program object "Ques1" is wired to the "Add Logic Row" button 351. When another wire is dragged from the identical ribbon "Response" in the identical program object "Ques1" to the previously created logic row 308, the "ditto row" 308a is created just below the previous logic row 308. It is a repeat of the previous logic row. This allows the table to evaluate a different expression for the identical ribbon. For example, in FIG. 3, the logic row 308 evaluates the ribbon "Response" in the program object "Ques1" for the words "cat" or "dog". The next "ditto" row 308a evaluates the same ribbon in the same program object for the word "bird". Using the same procedure of wiring from the identical ribbon in the identical program object to its wired row, ditto rows can be created for either logic rows 301 or value rows 303.

Truth Table: Now Column

The first column 302 in the Truth Table 300 has the title "Now". This first column 302 shows the current state of incoming properties and their associated expressions. This column does not move.

Truth Table: Associated Data Columns

The associated data includes the data associated with the incoming property of the program object. In the example shown in FIG. 3, the associated data is included in the associated data table 306, and includes Boolean properties. A Boolean property has a value of true or false. When a new incoming property is wired to the Truth Table 300, each incoming property appears in a new logic row, and the incoming property is associated with a value of true or false such that a new logic row with its associated T/F data in the associated data table 306 is created.

Each column in the associated data table 306 represents a "property state", which is a string of Boolean properties such as FFFF or TFFF as shown in FIG. 3. Each T or F value shows the "state" of the associated incoming property, by evaluating the value of the incoming property against the expression in the expression column 304. For example, in column 4 of the associated data table 306, the "T" in row 305 shows that the evaluation of the incoming property "Gauge: number" is "True". Here, the number in the gauge is equivalent to "50". The "T" in column 4 of the associated data table 306 in row 308 shows that the evaluation of the incoming property "Ques1: response" is "True". Here, the response to Question 1 is "cat", "dog" or "bird". The "F" in column 4 of the associated data table 306 in row 311 shows that the evaluation of the incoming property "Button: Clicked" is False. Here, the Button is not clicked.

In one implementation, as more incoming properties are wired to the table 300, the respective number of columns 306 in the associated data table 306 is created to show all possible combinations of True (T) and False (F). In one instance, when more columns are created than can be shown, a scroll bar 358 appears to allow the columns to be scrolled into view. The table also can be lengthened or shortened to show more or less columns respectively by moving thin "resize" columns, one of which is shown at 359.

In some examples, a current state column is provided for the current state of incoming properties and their associated values, and a column that matches all the T and F data in the current state column is highlighted, thereby becoming a "satisfied" column. In the example shown in FIG. 3, a first column 302 in the associated data table 306 having the title "Now" shows the current state of incoming properties and their associated values. This column does not move when the columns are scrolled into view. In this example, the currently satisfied column 306a is shown with a white highlight color. If the currently selected column 306a moves out of view either by scrolling or by resizing the table, the "snap" icon 347 appears. When the snap icon 347 is clicked, the selected column 306a is moved into view, with the columns adjusting accordingly. A "satisfied" column means that all the True (T) and False (F) data in the column matches the results of the evaluation expressions in the expressions column 304.

Truth Table: Value Rows

The Truth Table 300 further includes value rows 303. In the example shown in FIG. 3, five value rows 321, 328, 329, 330 and 331 are shown, but the number of value rows is not particularly limited. In one example, a new value row can be added by either attaching a wire from a program object to a "Add Value Row (+)" button 350, or by clicking the "Add Value Row (+)" button 350.

The value rows 303 include expressions to assign values and hold the data that is exported from the Truth Table 300. The name column of the value rows 321, 328, 329, 330 and 331 can be edited to name the category of values that the respective row holds. The expression column 304 of the value rows 321, 328, 329, 330 and 331 can be used to input identical or sequential values. In one instance, if identical values are used, that value is inputted in column 304 of the value rows 303. For example, column 304 of value row 321 has an inputted value of "6", and thus the value row 321 repeats the value "6". If the value row 321 were to hold sequential values, a "–" can be added to the value "6", so the expression would be entered as, for example, "6–" rather than "6". In value row 328, each value is non-repetitive, so there is no need to enter an expression in the expression column 304. Individual values also can be manually edited to hold custom values that are an exception to a sequence of numbers, as is seen in cells 368.

The expressions can reference other value rows by name. For example, in FIG. 3, the expression in column 304 of value row 329 refers to the name of the value "Points" in column 317 of value row 321. The expression in column 304 of value row 329, "=Points+5" means that a value of "5" points is added to each value in the value row 321. Expressions can also create other types of formulas that reference other value rows. For example, the expression "=sum (bar 1 . . . bar3)" means that "for each column, total the values contained in value rows "bar 1", "bar 2", and "bar 3"".

The associated data table 306 for the value rows 321, 328, 329, 330 and 331 include value fields. The data in the value fields can be alpha or numeric. The length of the numeric or alpha value data can be any length. The value field also can hold other types of data. For example, value row 330 holds location and rotation information (XYR) for the "Move Marker" property. This location information includes an object with a horizontal "X" and a vertical "Y" location, and a rotation angle "R". In value row 330 in the associated data table 306, this location and rotation information is graphically represented by a grid chart and marker in each cell. A value row can also hold color information. For example, in value row 331, each column in the value row 331 of the associated data table 306 holds a color value that is represented as a color chip.

Truth Table: Incoming Property Ports

Incoming properties are received as inputs by the Truth Table 300 at incoming property ports. In the example shown in FIG. 3, four incoming property ports, 332, 334, 335 and 342 for each incoming property wire are shown. The incoming property ports 332, 334, 335 and 342 allow wiring of a property of another object to the incoming property ports 332, 334, 335 and 342. They also allow wiring from the incoming property ports 332, 334, 335 and 342 to a property of another object, thereby making the incoming property wires bindable, two-way ports. A two-way port allows data to be sent to the table, and also allows data to be sent out to a program object.

Truth Table: Outgoing Property Ports

The Truth Table 300 also includes outgoing property ports 301a. The outgoing property ports 301 a are interfaces that can send data out from the table through attached property wires. In the example shown in FIG. 3, four outgoing property ports, 361, 365, 367 and 369 for each incoming property wire are shown. In one example, the outgoing property ports 361, 365, 367 and 369 can switch between three modes: one-way or read-only binding, two-way binding, and outlet.

In the one-way or read-only binding mode, binding is made from one of the outgoing property ports 301a to a program object such that changes in the properties of the Truth Table 300 would be reflected in the properties of the wired program object, but not vice versa. The one-way, read-only binding mode is visually represented by a large and a small rectangle 343 and 344, respectively.

In the two-way binding mode, binding is likewise made from one of the outgoing property ports 301a to a program object such that changes in the properties of the Truth Table 300 would be reflected in the properties of the wired program object, and vice versa. The two-way binding mode is visually represented by a small and large dot, 345a and 345, respectively. In the outlet mode, the outgoing property port fires a one-way signal to an inlet port in a program object. A signal is fired when the evaluation of the expression becomes True "T". This signal activates an inlet action in the program object, such as: Show, Hide, Go to page, and other actions. The outlet binding mode is visually represented by a small and large triangle, 346.

In the column row, there is a two-way outgoing property port 360 that sends the current column number to attached program objects. Because it has a two-way binding mode, it can also receive a column number from a wired program object. When it receives a column number from a wired program object, the Truth Table 300 makes that column the selected column, and the values of the incoming properties change to match those shown in the newly selected column.

Truth Table: Value Property Ports

The value rows, 303, 303a, contain two-way binding property ports on both the left and right ends of the rows, 321, 328, 329, 330, 331 and 391, 394, 393, 382, 383. They can both receive data from program objects, and send data out to program objects. The value rows, 303, 303a, can be wired on either the left or right end. For example, in FIG. 3, both the wires, 349, 352, for value row, 328, will send the value "correct" from the selected column 306a in value row 328, or receive data to change the value "correct" to a different value.

Truth Table: Out Ports and Out Bays

The out ports 384 can be wired to objects to trigger actions when a column is satisfied. When a column becomes the current state, the out ports 384 fire a one-way signal to an inlet port in a program object to signal that the column has been satisfied. The out wire bays 381a, 381b can be used to collect the wires if there are wired columns that are not in view because the table has been compressed.

Truth Table: Play Controls 356 and Inlet Ports

The Truth Table 300 further includes play controls 356, and several types of inlet ports: judge-now inlet 372, reset table inlet 374, control inlets 376, and power inlet 373. The play controls 356 allow an author to step through the columns of the associated data table 306. When the judge-now inlet 372 is clicked, the table evaluates the current data. When the reset table inlet 374 is clicked, the table resets all evaluations to the original settings. The control inlets 376 allow external buttons to be wired to the table, to control stepping through its columns or "playing" the table. The functions of the control inlets 376 duplicate the functions of the play controls 356, but they can be wired externally. The power inlet allows the tables' capability to judge (evaluate) to be turned on or off The table's power to judge is "on" by default. An inlet wire can be wired from a program object to the power inlet 373 to externally turn the table's power to judge on or off Truth Table: Tween Bar The Truth Table 300 also includes a Tween bar 398. The Tween bar includes a Tween row 395, Secs-transition row 396 and a Secs-hold row 397. Tween row 395 includes XY graphs of lines or curves in the respective cells for columns 2-5 of the data table 306. Visual line representations such as lines and curves represent algorithms which can be applied to the transition between states. The Secs-transition row 396 includes numerical values in the respective cells for columns 2-5 of the data table 306. The numerical values in the Secs-transition row 396 represent the number of seconds within which the transition between states should occur. The Secs-hold row 397 also includes numerical values in the respective cells for columns 2-5 of the data table 306. The numerical values in the Secs-hold row 397 represent the number of seconds of delay before the transition from the previous state to the new state begins.

The Tween bar 398 can be used to manipulate the transition between states of an object. For instance, an audio object may have two properties, volume and XY coordinates, and each of the two properties may have two states, where each of the states has different values from one another for the respective properties. In one example, a user can set a linear algorithm represented by the straight line as shown in the Tween row 395 of column 2 of the data table 306, the "Secs-transition" value to 1 as shown in the Secs-transition row 396 of column 2 of the data table 306 and the "Secs-hold" value to 3 as shown in the Secs-hold row 397 of column 2 of the data table 306. In this instance, when the logic table receives a trigger to change the state of the audio object from an initial state into a subsequent state, there would be a three second delay, and then the audio object would move from a first position to a second position, and the volume would adjust from a first volume to a second volume over a one second transition period in a linear manner. If the user instead sets a "bounce" algorithm represented by a lipped v-shaped curve as shown in the Tween row 395 of column 3 of the data table 306, the audio object would "bounce" into and/or out of the transition. If the user instead sets an ease algorithm represented by the curve as shown in the Tween row 395 of column 4 of the data table 306, the audio object would ease in and/or out of the transition. In some examples, the tween bars have at least about 20 tween transitions. The number of tween transitions a tween bar can have is not particularly limited. In other examples, each tween transition is represented by a visual line representation and a respective name.

Truth Table: Flowchart And Example

Figure 4A:
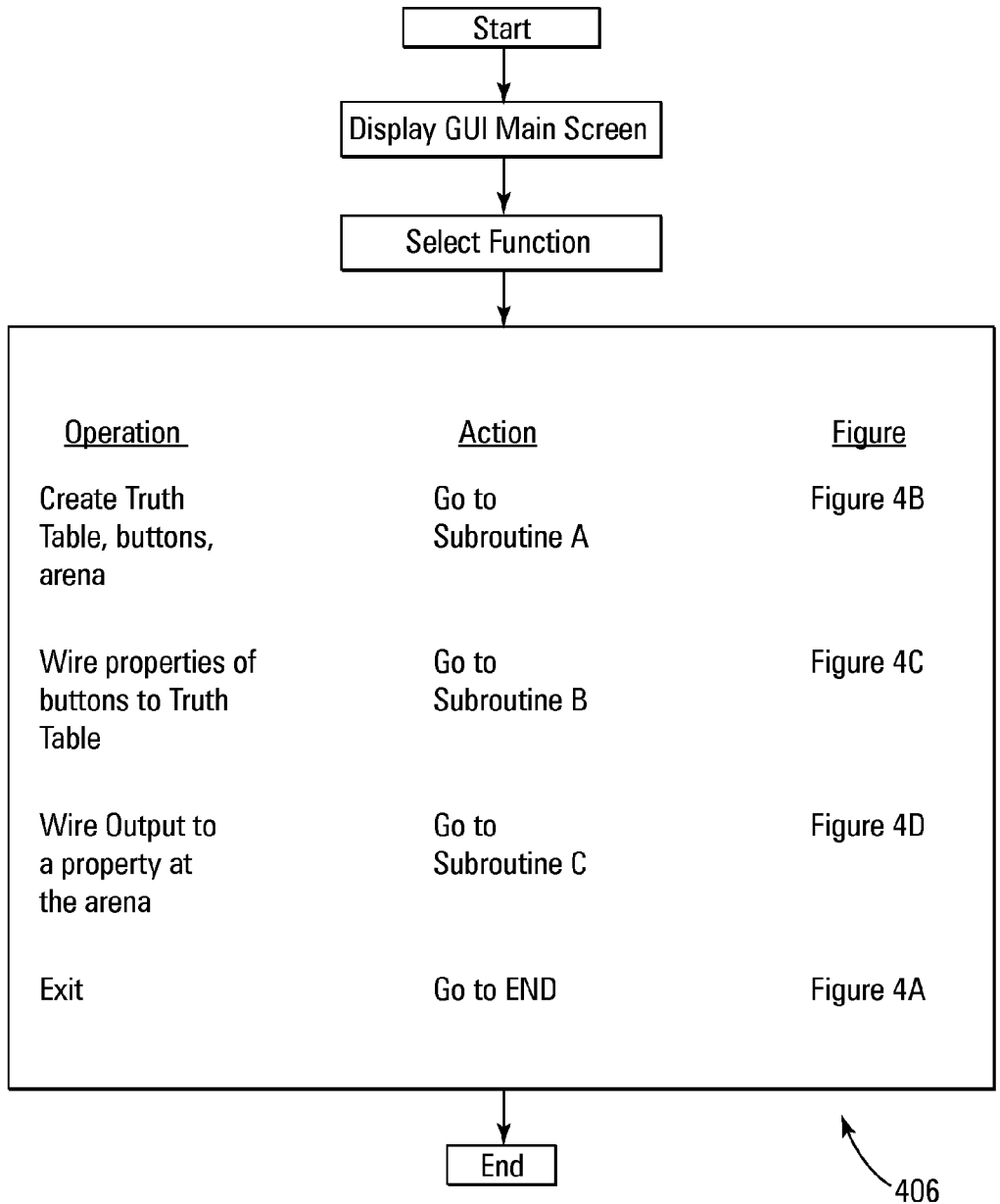
FIGS. 4A-4C are flow charts of one embodiment of the disclosed method.

FIG. 4A is a flowchart showing a procedure of a process executed by the system 100 in accordance with one embodiment of the disclosed method.

Figure 5:
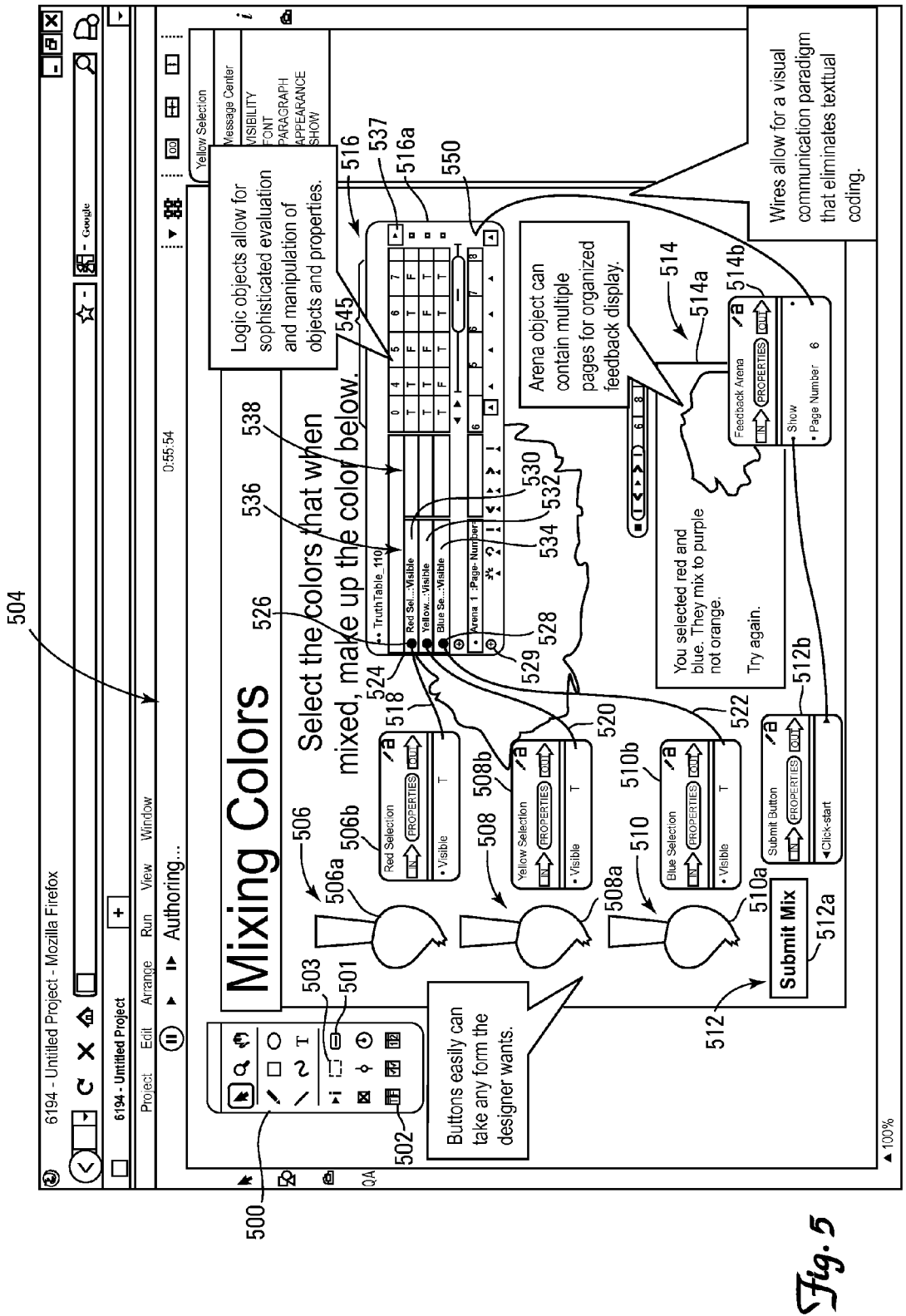
FIG. 5 illustrates one embodiment of a GUI implementing a Truth Table as a logical object.

Referring to FIG. 4A and FIG. 5, once the program begins, a graphical user interface (GUI) window 504 is displayed on an image display of the user terminals 110-A and 110-B.

Figure 4B:
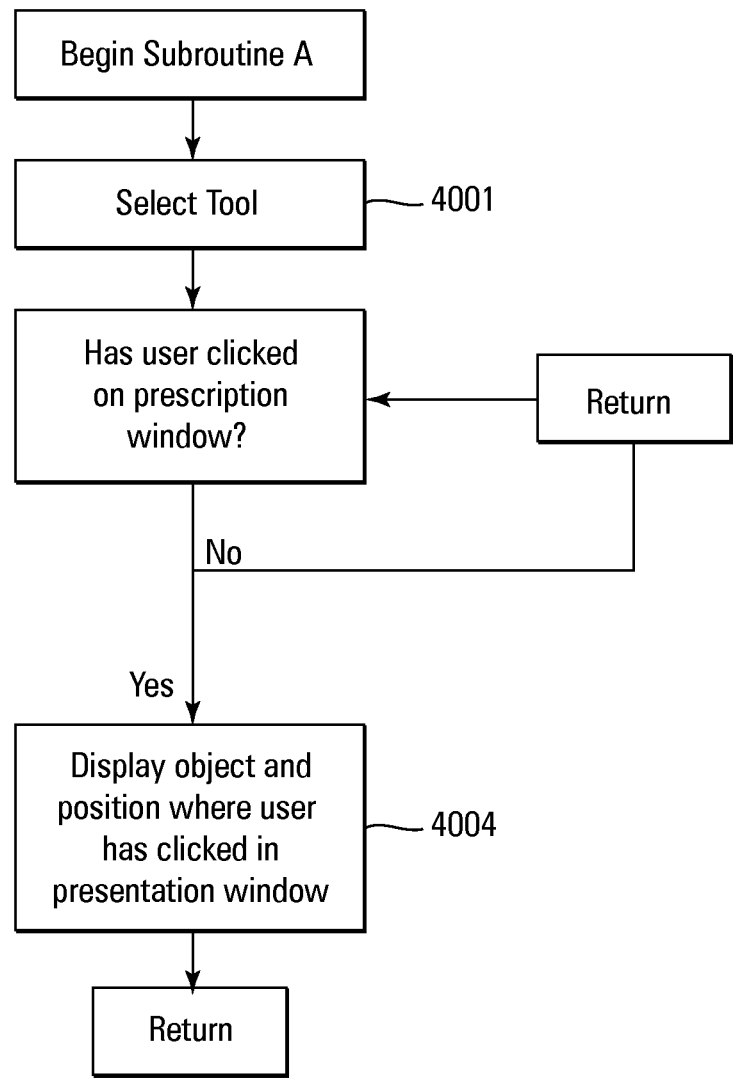

FIG. 4B is a flow chart of one embodiment of a process involved in creating objects. This corresponds to subroutine A in FIG. 4B. Referring to FIG. 4B, a toolbox is opened. The toolbox can include a set of tools including a Button tool, Truth Table tool, an Answer Table tool, State Table tool, and Arena tool, etc. In the example shown in FIG. 5, a toolbox 500 is shown in the window 504. The toolbox 500 includes a Button tool 501, a Truth Table tool 502, and an Arena tool 503. The user can create an object by selecting the applicable tool in the toolbox 500 with a pointing device, then clicking in the window 504 to create the related program object.

FIG. 5 shows the window 504 as displaying six objects 506, 508, 510, 512, 514 and 516. The object 516 is a Truth Table 516 created by the Truth Table tool 502. The Truth Table 516 has a visual graphics component 516a. Although not shown, the Truth Table 516 may also include a message center. The message center in general provides a list of the properties for an object, where a user can link properties between objects by dragging a wire from one of the properties listed to a property of another object. The visual graphics component 516a of the Truth Table 516 includes logic rows 530, 532 and 534, a name column 536, an expression column 538, a value row 540 and an associated data table 545.

The other objects include buttons 506, 508 and 510, which are button objects created by the button tool 501, and the arena 514, which is an arena object created by the arena tool 503. Although in the example described later, the buttons 506, 508 and 510 and the arena 514 are used for linking with the Truth Table 516, other types of objects also can be used for linking with the truth table, such as sketch, rectangle, oval, line, animation path, text, text input, checkbox, slider, clock, other tables and other program objects. These objects can be created by tools such as pencil, oval, slider, etc. The number of objects that can be created in the 504 is also not particularly limited.

Figure 4C:
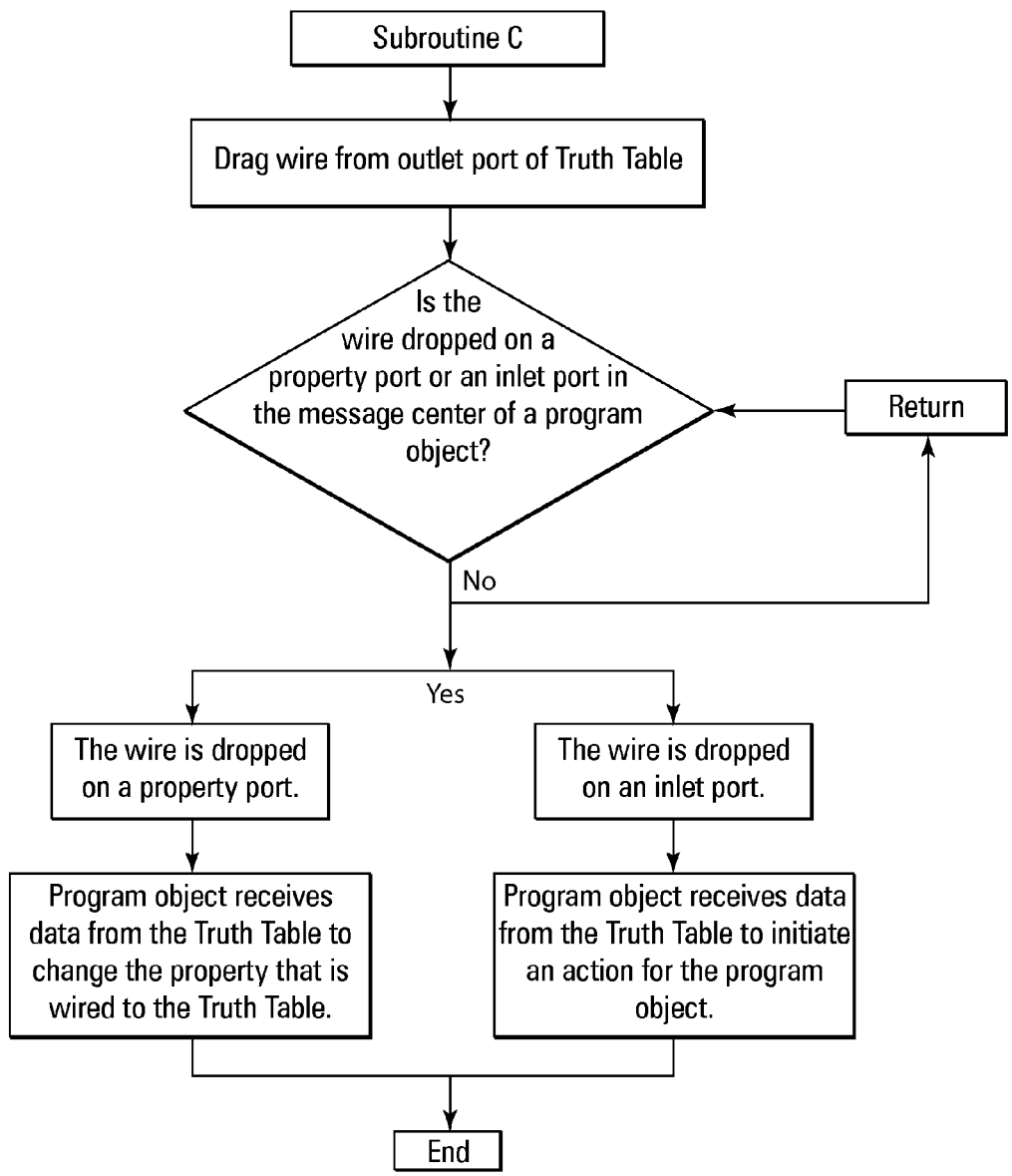

FIG. 4C is a flow chart of the process involved in linking the buttons 506, 508 and 510 to the Truth Table 516. This corresponds to subroutine B in FIG. 4C. The subroutine begins with a call to subroutine A. Referring to FIGS. 4C and 5, the buttons 506, 508 and 510 have visual graphics components 506a, 508a and 510a and message centers 506b, 508b and 510b, respectively. In the example shown, the visual graphics components 506a, 508a, 510a are shown as paint brushes, but the visual graphics components can take any form a user desires.

Referring to FIGS. 4C and 5, links between a property of the buttons 506, 508 and 510 and the Truth Table 516 are established by dragging wires 518, 520 and 522 from the properties in the respective message centers 506b, 508b and 510b of the buttons 506, 508 and 510 and dropping the wires on respective input wire anchors 524, 526 and 528 on the left edge of the visual graphics component 516a of the Truth Table 516 (step 4021). The input wire anchors 524, 526 and 528 are on the left edge of the value rows 530, 532, and 534. If the wire is neither being dragged nor dropped, the process is in a wait state until a drag or drop operation is performed.

Once the wires 518, 520 and 522 are dropped on the input wire anchors 524, 526 and 528, identifiers or ribbon names of the incoming properties of the buttons 506, 508 and 510 are provided in the name column 536 of the respective value rows 530, 532 and 534. For instance, the property being wired for button 506 is the visibility of the button when selected. In the name column 536 of the value row 530, "Red Select: Visible" appears.

Dropping of the wires 518, 520 and 522 results in the system 100 linking the properties of the buttons 506, 508 and 510 to property states as displayed in the data table 545. The term "property state" herein means a combinatorial expression of any value and any number of values. The property states enumerate all possible permutations of any number of incoming properties with a numerical value property, which serves as an output of the truth table. In one instance, the property state is a combinatorial expression of two values, true or false. In this instance, the property state can be a string of values such as TTF with the number of properties corresponding to the number of inputs. In the present example, there are three inputs, and the total collection of property states would be: TTT, FTT, TFT, FFT, TTF, FTF, TFF, FFF.

In FIG. 5, TTT, TTF, FFT, TFT and FTT are provided in columns that are numbered 0, 4, 5, 6, and 7, respectively. The column numbers 0, 4, 5, 6 and 7 identify each of the respective columns, and represent a property state.

Column numbers are employed to associate between a property state and an incoming property of a program object. For example, as shown in FIG. 5, column numbers 0, 4, 5, 6 and 7 are provided in column row 535 that has an outlet port 537 at the far right side of the column row 535. When the outlet port 537 is wired to a property in a program object (not shown), the outlet port 537 sends a column number to the program object. The outlet port 537 is a two-way port, so the program object can also send a column number to outlet port 537. When the Truth Table 516 receives the number from the program object, the appropriate column becomes the selected column, and the values of the attached inlet properties are changed to those shown in the selected column.

In the instance shown in FIG. 5, the property states TTT, TTF, FFT, TFT and FTT have column numbers 0, 4, 5, 6 and 7, respectively. Column 0 has a current or "now" property state. Column 6 is shown to be the currently selected property state. In the instance shown in FIG. 5, the value bar 545, which has the name "Arena 1: Page-numbers", has values of 6, 0, 5, 6, 7, 8, for column numbers 0, 4, 5, 6 and 7, respectively. The value bar 545 is wired though a property port 550 to the Arena object 514 via a wire 552. Specifically, the wire 552 is wired to the "Page-number" ribbon which is part of the message center 514b. When a column is satisfied in the Truth Table 516, the value bar port 550 sends the value that is in the value bar 545 of the selected column number 6 to the Arena's 514 message center 514b. In this instance, that number controls the page that is shown in the Arena 514, the controlling number being page 6. This page number is shown in a control bar 514c for the Arena 514.

In another instance, a user may have a second value bar with values 20, 30, 40, and 50, for the columns 4, 5, 6 and 7 respectively. In one example, the second value bar can be named as "Points". In this instance, the numbers 20, 30, 40 and 50 are point values that are sent to a text object that displays the points being earned.

Although not shown, in one instance, evaluation expressions for the incoming properties are displayed in the expression column 538 of the value rows 530, 532 and 534. In this instance, these expressions have the format "=expression". In one implementation, the expressions would evaluate for True (T) or False (F) as the incoming ribbons have a value of True (T) or False (F). The expressions for this example could include: "=T", "=F", "=T|F". The expression "=T|F" means that the value of the incoming property could be evaluated as True (T) when the incoming property is True (T) and when the incoming property is False (F).

New value rows can be created in a number of ways. One way is to attach a wire from a program object to either the left-side or right-side property port 550 or drag and drop the wire on the "Add Value Bar" button 545. Another way is to click the "Add Value Bar" button 545 to add a new value bar.

In the instance shown in FIG. 5, the "Submit Mix" button 512 is wired 512b to the "Feedback Arena" object. The outlet "Click" for the "Submit Mix" button is wired to the inlet "Show" for the Arena object. When the button "Submit Mix" is clicked, the Feedback Arena is shown, which makes its feedback information visible to the user. In another instance, the "Submit Mix" button, or another program object, could be wired to hide the Feedback Arena when it is not needed.

Answer Table

Answer Table: Overview

FIG. 6A shows one embodiment of the disclosed logic table that can be used as a program object. A name row 600a identifies the type of the logic table 600. In the present embodiment, the logic table is an Answer Table 600 that allows the table to assess user answers and responses, and to manipulate properties of objects within a multimedia computer application based on conditional logic and the sequence of the answers or responses.

FIG. 6A shows an example of an Answer Table 600. The Answer Table 600 shown in FIG. 6A is similar to the Truth Table 300 in that the Answer Table 600 also includes the following items which function in a similar way to the way that they function in the Truth Table 300. In this regard, reference is made to the description above for the corresponding items in the Truth Table 300.

table name row 600a
logic rows 601
property name column 617
expression column 604
ditto rows 608a
"Now" column 602
associated data table 606
value rows 603
incoming property ports 632, 635
outgoing property ports 644, 645, 646
value property ports 648, 649, 651, 652, 653, 654
out ports 684
out wire bays 681a, 681b
play controls 656
judge now inlet 672
reset table inlet 674
control inlets 676
power inlet 673
Tween bar 698.

Answer Table: Answer Judging

In one example, the Answer Table 600 differs from the Truth Table 300 in how expressions are judged in the associated data columns. With reference to FIG. 6A, the associated data columns evaluate expressions with a method of checks 606b and numbers 606a to evaluate expressions in terms of sequence. Each column is considered to be one "answer". The user must satisfy each logic row expression in the order that is shown in the associated data table 606. A logic row expression is satisfied when its expression is evaluated as True (T).

If a cell in the data columns has a checkmark 606b, the expression in that logic row must be true, and it can be true in any sequence. When an expression can be true in any sequence, the criteria for that column to be satisfied as an answer is that all expressions with a checkmark are evaluated as True (T), but it does not matter in what sequence those expressions are evaluated as True (T).

If a cell in the data column has a number 606d, then the expression in that logic row must be both true, and it must become true in the sequence shown by the series of numbers in the associated data cells in the column. For example, in FIG. 6A, in column 3, logic row 608 must become true first because the associated data cell has a sequence number "1". Then logic row 609 must become true after logic row 608 because the associated data cell has a sequence number "2". Then logic row 608a must become true after logic row 608 because the associated data cell has a sequence number "3". If the user's choices cause these properties to become true in difference sequence, the answer in column 3 is not satisfied.

Checkmarks and sequence numbers can be combined. For example, in FIG. 6A, in column 2, logic row 608 must become true before logic row 608a, but logic 608 can become true in any sequence, before, after, or in-between when the logic rows 608 and 608a become true.

The Answer Table 600 uses a notation system that uses checkmarks, numbers and characters to represent different forms of sequencing. This system of sequence notation is described in FIG. 6B.

When a cell in the associated data columns 606 is satisfied, cell changes color. For example, in FIG. 6A, the cell in column 1 for logic row 608a has been satisfied, so the color in cell of column 1 for logic row 608a has changed to green 606c. If a cell has been satisfied, its color has changed to green, and the column is also the currently selected column, the color of the satisfied cells then changes to a lighter green, as shown in the cell of column 2, logic row 608a.

The Answer Table 600 judges from left to right. That is, the Answer Table 600 evaluates column 1 first, then moves to column 2, then to column 3, etc. and continues to move to the right until a column that is fully satisfied is reached. The Answer Table 600 judges that a column is fully satisfied when all cells in the column that are marked with a checkmark or sequence number have been satisfied. When that happens, the entire column turns green, including the column number, the logic cells and the value cells. For example, in FIG. 6A, column 5 is fully satisfied. If the Answer Table 600 cannot find a column that is satisfied, the Answer Table 600 starts again with column 1, and proceeds to evaluate each column from left to right until the Answer Table 600 finds a column that is satisfied. The Answer Table 600 repeats this pattern of judging unless the table is turned "off".

Answer Table: Branching

The Answer Table 600 includes a system of branching. This is shown in the Branching Row 610. When a column is satisfied, the Answer Table 600 follows the branching set by the branching button 610a in its column. The branching button can be clicked to cycle between three types of branching:
1. Continue: shown as a right-facing arrow 610a. This branching continues to evaluate from left to right. Evaluation moves to the next column.
2. Try Again: shown as an arrow with a "reversed-"C" curve that points to the left. This branching stops the left-to-right judging scan, and waits for more input from the user.
3. Exit: shown as an arrow that points down. This branching stops the judging scan. The Answer Table 600 is exited, and its power is turned "off".

Answer Table: Status Port and Status Message

The Answer Table 600 includes a Status Port and a Status Message 610b. This shows the current operating status of the Answer Table 600. The status port is a one-way, read-only port that sends out the number associated with each status condition. The status message displays the current status condition, and the number associated with that status condition. For example, in FIG. 6, the Status Message 610b shows that the Answer Table 600 is in a "Ready" status condition, which means it is ready to receive further input. The number of status conditions will be approximately five status conditions, but are not limited to that amount.

Answer Table: Example

Figure 7:
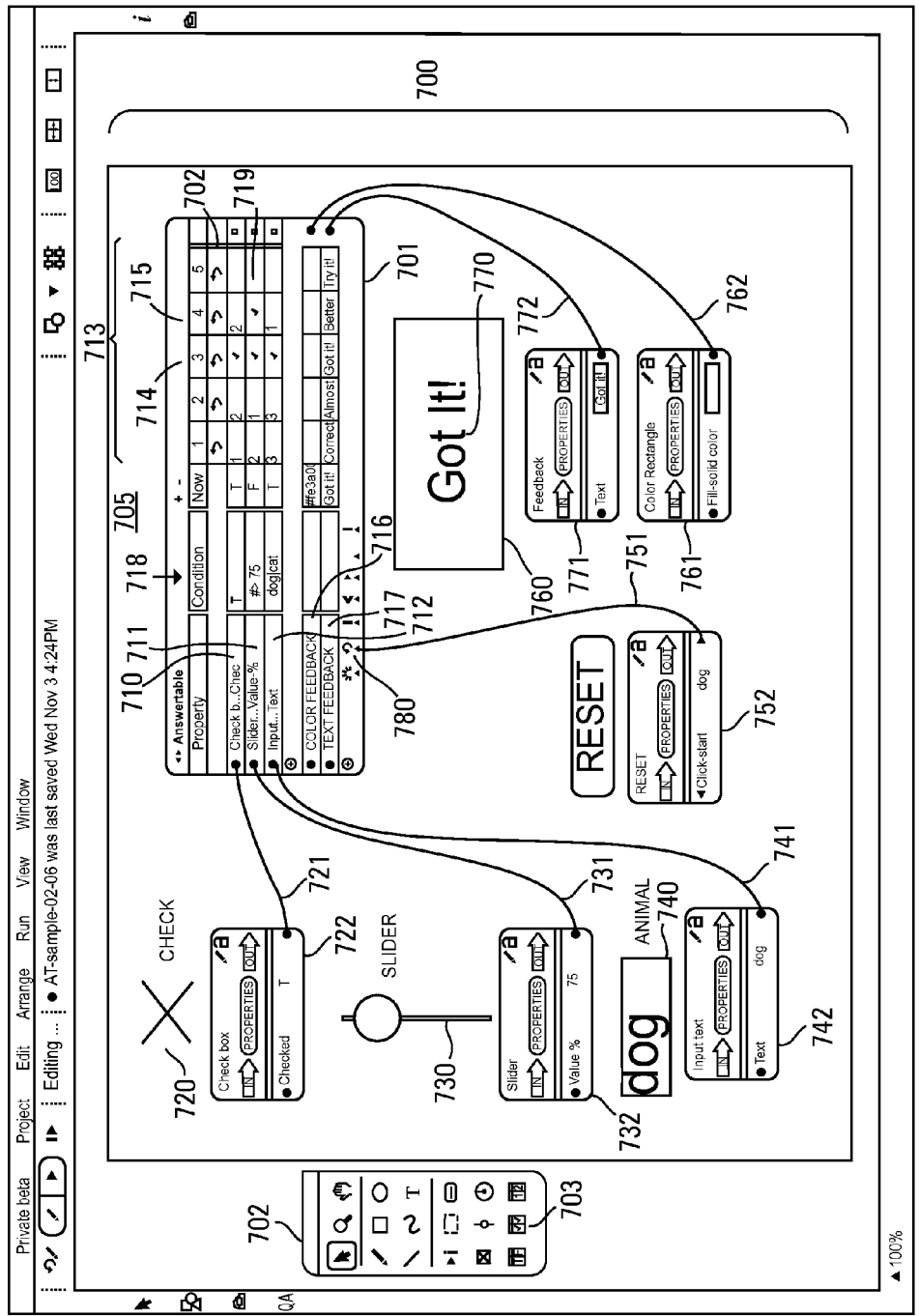
FIG. 7 illustrates one embodiment of a GUI implementing an Answer Table as a logical object.

FIG. 7 is one example of an Answer Table in use. In this embodiment, an answer judging multimedia computer application is provided that shows how the Answer Table judges for answers in different sequences.

FIG. 7 shows a window 700 displaying the following objects: a checkbox 720, a slider 730, an animal text input field object 740, a reset button 750, and both a color rectangle feedback object 760 and a text feedback object 770. There is also an Answer Table object 705. The Answer Table object was created using the Answer Table tool 703 available in the toolbox 702. The other objects 720, 730, 740, 750, 760 and 770 were created respectively with a checkbox tool, a slider tool, a text input tool, a button tool, a rectangle tool, and a text tool in the toolbox 702.

Properties of the checkbox 720, the slider 730, and the animal input text 740—are wired into the logic rows 710, 711, 712 respectively of the Answer Table object 705. A Checked property in a message center 722 of the checkbox 720 is wired to the logic row 710 in the Answer Table object 705. A Value-% property in the message center 732 of the slider 730 is wired to the logic row 711 in the Answer Table object 705. A Text property in the message center 742 of the animal text input field object 740 is wired to the logic row 712 in the Answer Table object 705. In the Expression Column 718, an expression has been entered to evaluate each incoming property. When an expression is evaluated as True (T), then the expression is determined to have been satisfied.

Associated data columns 713—columns 1, 2, 3, 4, 5—contain commands to judge both if the properties 710, 711, 712 have been satisfied, and in what sequence the properties 710, 711, 712 have been satisfied. If a property can be satisfied in any order, its cell has a checkmark. If a property must be satisfied in a specific sequence, its cell has a sequence number. For example, in Column 1, the properties 710, 711, 712 must be satisfied in sequential order. In Column 2, the property 711 must be satisfied first, then property 710 must be satisfied, and then property 712 must be satisfied. In Column 3, the three properties can be satisfied in any order. In Column 1, the property 711 can be satisfied in any order, but the property 712 must be satisfied before the property 710 is satisfied. Column 5 has no judging criteria, so it "catches" any responses that do not match the previous columns 1, 2, 3, and 4.

Below the logic rows are two value rows 716 and 717. The value row 716 changes the color of the color feedback rectangle 760, depending on which column is fully satisfied. The Fill property in the message center of the color feedback rectangle 760 is wired to the value row 716 in the Answer Table 705. The value row 717, changes the text of the text feedback object 770, depending on which column is fully satisfied. The Text property in the message center of the text feedback rectangle 770 is wired to the value row 717 in the Answer Table 705.

The columns 713 show that all three properties 710, 711, 712 have been satisfied, but they were not all satisfied in the order that is required by some of the columns. For a property to be satisfied in the columns, it must be evaluated as True (T) and it must be done in the order required by the column. When a property in a column is satisfied, the color of the cell changes, for example, to green 719. In this example shown in FIG. 7, Column 3 has been fully satisfied. When a column is fully satisfied, all properties in all those logic rows which are being judged with a checkmark or a sequence number have been satisfied. When a column is fully satisfied, it is selected by the Answer Table object 705. When a column is selected, the column number cell changes, for example, to white. In the example shown in FIG. 7, column 3 is selected so that its column number cell is, for example, white. When a column is satisfied, its values are sent from outgoing property ports 701 to the properties in external program objects to which they are wired. In this example shown in FIG. 7, because Column 3 is selected, the value row 716 has sent the color red to the color feedback rectangle, and the value row 717 has sent the text "Got it!" to the text feedback object 770.

Column 4 is also satisfied, but it is not selected. That is because the Answer Table object 705 judges columns from left to right. In other embodiments, an Answer table object can judge columns in a different order. Branching 702 controls what the Answer Table object 705 does when a column is satisfied and is selected. In this example, column 3 is satisfied and selected. The branching 702 for column 3 has been set to "Try Again", which means that the Answer Table object 705 sends out the data values associated with this column, and pauses to wait for more responses from the user. The Answer Table object 705 does not continue judging left to right, so it has not selected column 4, even though it is fully satisfied. If the branching 702 for column 3 had been set to "Continue" (not shown), the Answer Table object 705 would continue judging left to right, and would recognize that column 4 is fully satisfied. If the branching for column 4 has been set to "Try Again", the Answer Table would then stop at Column 4, and send out a value data to those properties wired to the outgoing property ports 701.

This example also includes a Reset button 750. The out "Click-start" in a message center 752 of the Reset button 750 is wired to a Reset Table inlet 780 in the Answer Table object 705. When the Reset button 750 is clicked, all judging results are cleared, all the column cells change to gray to show they have not judged the incoming properties, all the incoming properties are reset to their default values, and the Answer Table object 705 waits for responses from the user that it can judge.

In one embodiment, when this answer demonstration is run, the message centers, wires and the Answer Table object 705 hide (not shown). The user is directly controlling the three objects, and receives both color and text feedback. In another embodiment, when this answer demonstration is run, the message centers, wires and the Answer Table object 705 are visible to the user (not shown).

State Table

State Table: Overview

Figure 8A:
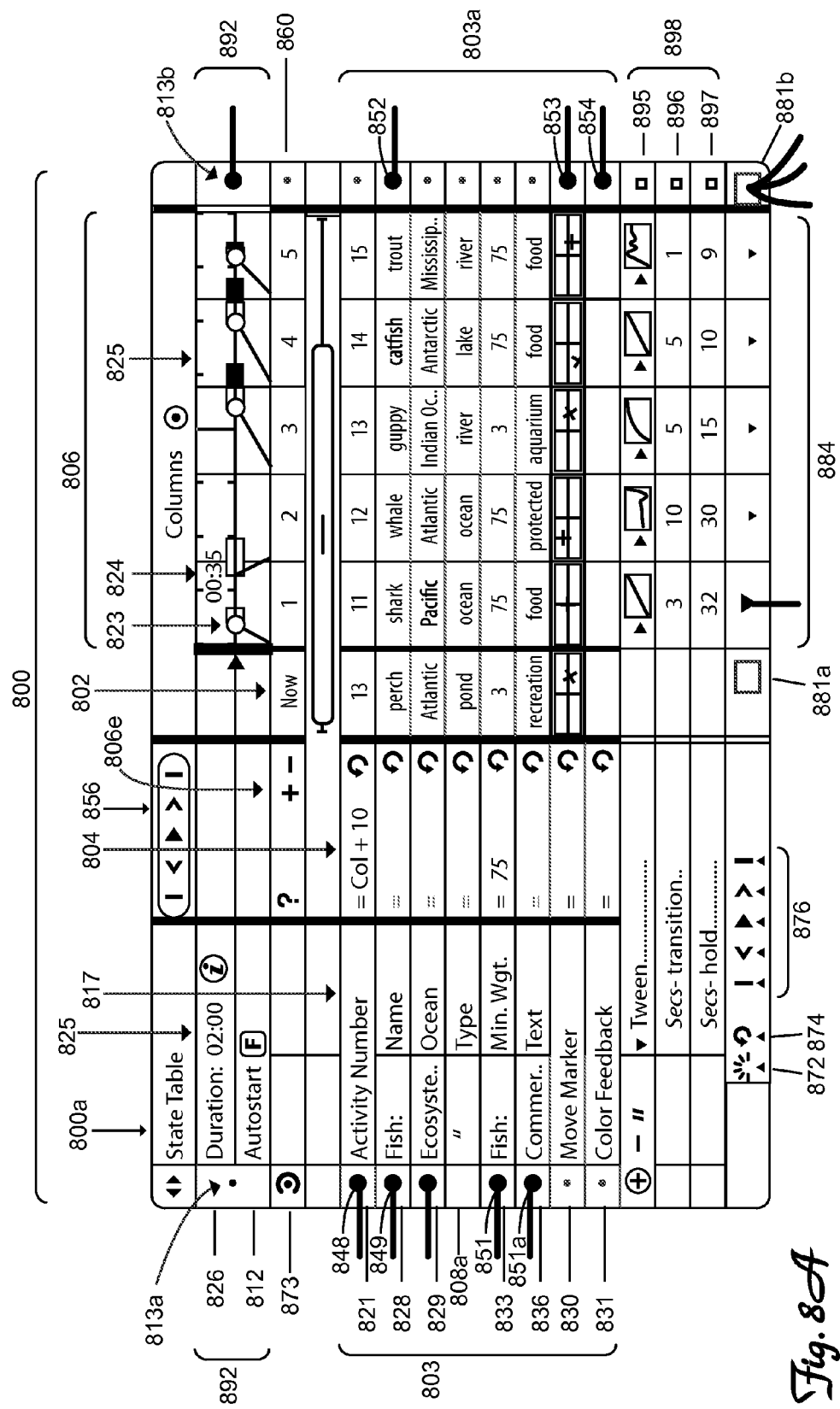

FIG. 8A shows one embodiment of the disclosed logic table that can be used as a program object. A name row 800a identifies the type of the logic table 800. In the present embodiment, the logic table is a State Table 800 that allows the table to store multiple values for properties of objects within a multimedia computer application to create a series of "states" for wired program objects that can be played back in a timed sequence using a Timeline.

The State Table 800 shown in FIG. 8A is similar to the Truth Table 300 in that the State Table 800 also includes the following items that function in a similar way to the way that they function in the Truth Table 300. In this regard, reference is made to the description above for the corresponding items in the Truth Table 300.

table name row 800a
property name column 817
expression column 804
ditto rows 808a
"Now" column 802
associated data table 806
value rows 803
value property ports 848, 849, 851, 851a, 852, 853, 854
out ports 884
out wire bays 881a, 881b
play controls 856
judge now inlet 872
reset table inlet 874
control inlets 876
power inlet 873
Tween bar 898.

In one example, the state table 800 does not use logic rows, incoming property ports or outgoing property ports.

State Table: States

With reference to FIG. 8A, the State Table 800 uses the value rows 803, 803a to assemble and store multiple values for the properties of program objects that are wired to the State Table 800. For example, in FIG. 8A, the value rows 803 hold multiple values for each incoming property 821, 828, 829, 808a, 833, 836, 830, 831. Values can include text, numeric, screen location, object rotation, color and other types of values. For the value row 828, its property name is "Fish: name", and it can have 5 values: "shark", "whale", "guppy", "catfish", and "trout". Each column shows a value for a group of wired properties. This is a "state" for that group of wired properties. For example, in FIG. 8A, for column 3, which is the currently selected column in FIG. 8A, the values for value rows 821, 828, 829, 808a, 833, 836, 830, 831 are respectively "13", "guppy", "Indian Ocean", "river", "3", "aquarium", approximately lower-right screen coordinates and a 45 degree rotation angle for the wired property "Move Marker" as shown visually by the location chart within that cell, and the color yellow as shown visually by a color chip within that cell. Collectively, this group of values, is the "state" for column 3. When a column is selected, the values in its cells are sent to the properties that are wired to the State Table 800. When a different column is selected, the properties that are wired to the State Table 800, receive a different set of values. As a result, a group of properties can present multiple "states" in response to user or program actions, or step through multiple "states" sequentially as a progressive sequence or animation because they are wired to a State Table 800, and the columns of the State Table 800 are changing accordingly to change the state of each wired property.

Properties 803 are wired to the value rows with two-way binding ports, so the State Table 800 can both send values to the wired properties, and also receive values from the wired properties.

State Table: Controls and Control Inlets

The State Table 800 can be controlled with the same items that the Truth Table 300 uses. These include the Play Controls 856 and the Control Inlets 876. The Play Controls 856 allow an author to step through the "states" of a State Table 800 while editing a multimedia computer application. The Control Inlets 876 allow external buttons to be wired to the State Table 800, to control stepping forward or backward through its columns or "playing" the table in a sequence.

State Table: Timeline

With reference to FIGS. 8A-F, the State Table 800 can also be controlled with its integrated timeline 892. The timeline 892 allows a duration 825 to be set, which creates a total length of time. On the right side of the timeline 892, there is a scaled timeline. Dots 823 can be dragged from each column to the scaled timeline to establish a time within the total duration 825 at which that column is displayed. This is the "start time" for that column. While a dot is pressed and dragged along the scaled timeline, the dot's color changes 824 and its time location along the timeline is shown as text above the dot 824.

The Timeline 892 has a "scrubber" control button 825. This "scrubber" button can be dragged along the scaled timeline. As it is dragged across the scaled timeline, the selected column changes as the "scrubber" moves past "start time" dots. This allows an author to test a sequence by moving the "scrubber" back and forth along the Timeline.

The Timeline 892 works together with the Tween Bar 898 in the State Table 800. When a transition time is set in the Secs-Transition row 896 of the Tween Bar 898, that number of seconds is shown visually in the Timeline as a blue bar 823a extending from the Start Time dot to the right as appropriate to show the number of transition seconds. When a hold time is set in the Secs-Hold row 897 of the Tween Bar 898, it tells the State Table 800 and the Timeline 892 to hold that number of seconds before displaying the next column. This creates a "start time" for the next column, so the "start time" dot 823 associated with that column moves along the scaled timeline to reflect the number of hold seconds 897. If a "start time" dot 823 for a column is moved, the hold seconds 897 for the previous column change accordingly. The Timeline 892 has an "Info" button 844. When the Info button 844 is clicked, a new "Timeline Data" table 844a appears. It shows the "start times" 823a, 824a, for each column as a time-formatted number. These "start times" reflect the position of the "start time" dots 823, 824 on the scaled timeline. For example, in FIG. 8A, the "start time" dot 823 is positioned at 00:35 along the scaled timeline. This time number 00:35 is also in the "Timeline Data" 844a start time field 823a. The number of "start time" fields in the "Timeline Data" table 844a reflects the number of columns that are in the State Table 800. The time value in each "start time" field can be edited. As the "start time" fields are edited, the "start time" dots 823 move on the Timeline accordingly to match the times that are entered into the "Timeline Data" 844a "start time" fields.

The "Timeline Data" table 844a has a "scrubber" 825a that emulates the function of the "scrubber" 825 in the Timeline 892. The "Timeline Data" table 844a can be closed by clicking the Close button "X" 844b.

The Timeline 892 is also available as independent Timeline 837a. The Toolbox 838 has a Timeline tool 837. When it is clicked, it creates a Timeline 837a that is independent of the State Table 800. Properties of program objects can be wired directly to "start time" dots 837b along the scaled Timeline. This allows properties and inlet actions to be wired to the Timeline, which allows series of properties to initiate or inlet actions to initiate in a timed sequence.

State Table: Example

Figure 9:
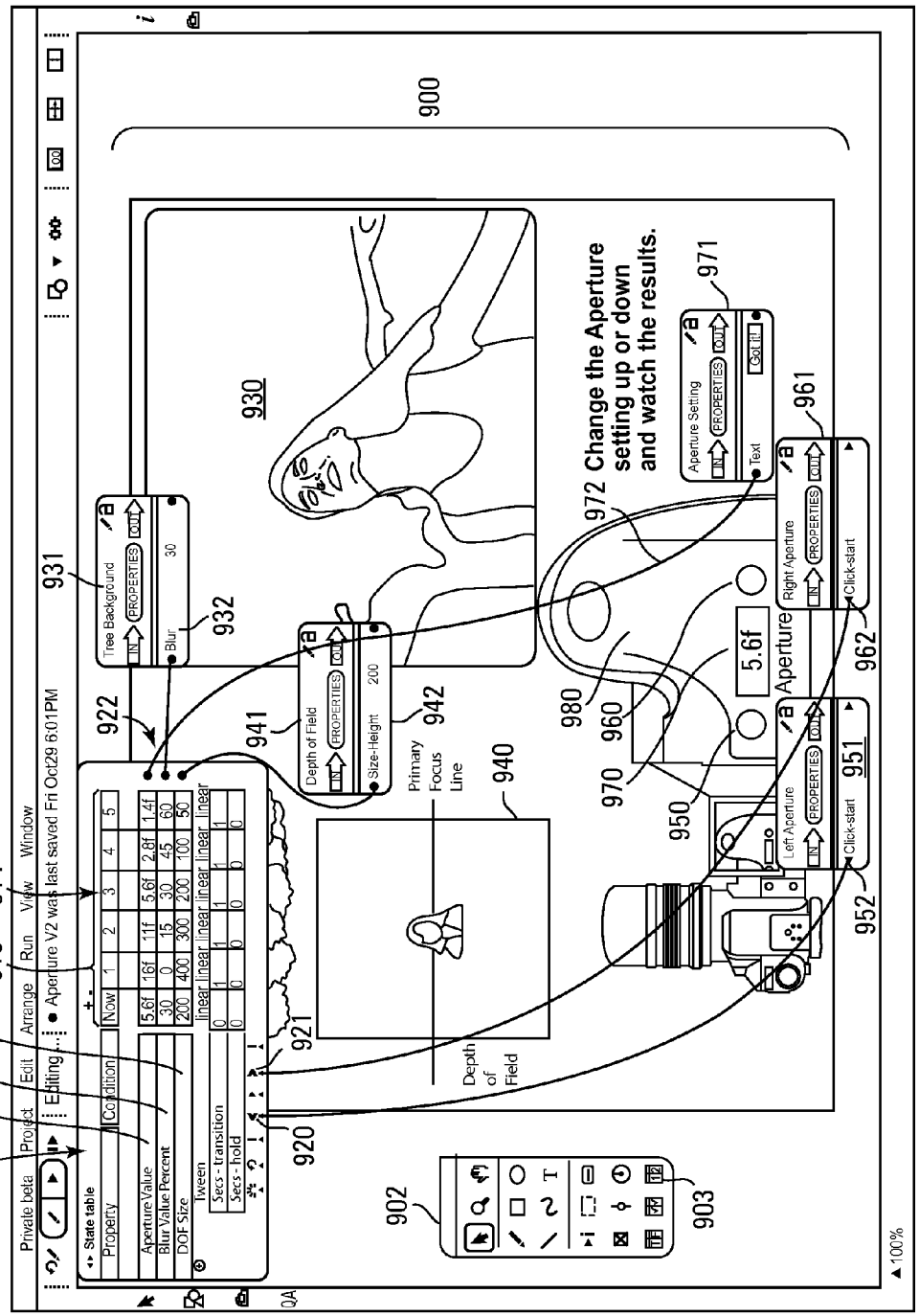
FIG. 9 illustrates one embodiment of a GUI implementing a State Table as a logical object.

FIG. 9 provides one example of a State Table in use. In this embodiment, a state table multimedia computer application for teaching how a camera's aperture setting affects the depth of field.

FIG. 9 shows a window 900 displaying several objects: a tree background object 930, depth of field scale 940, a camera object 980 that includes a left aperture button 950, a right aperture button 960, and an aperture setting display 970. There is also a State Table object 905. The State Table object 905 was created using a State Table tool 903 available in a toolbox 902.

Properties of the aperture setting display 970, the tree background object 930, and the depth of field scale 940—are wired into the value rows 910, 911, 912 respectively of the State Table object 905. The value columns 912—columns 1, 2, 3, 4, 5—contain 5 states of values for the aperture setting display 970, the tree background object 930, and the depth of field scale 940. The aperture setting display 970, the tree background object 930, and the depth of field scale 940 are each wired to the State Table object 905. A Blur property 932 in the message center 931 of the tree background object 930 is wired to a port in a State Table object bay 922. A Size-Height property 942 in a message center 941 of the depth of field scale 940 is wired to a port in the State Table object bay 922. A Text property 972 in a message center 971 of the aperture setting display 970 is wired to a port in the State Table object bay 922.

Column 3 in the State Table object 905 is currently selected, so those values are displayed in the aperture setting display 970, the tree background object 930, and the depth of field scale 940, respectively. The aperture setting display 970 shows the value 5.6 f, which is in the selected column 914 of the State Table object 905 in value row 910. The tree background object 930 shows a 30% blur, which is in the selected column 914 of the State Table object 905 in value row 911. The height of the depth of field scale 940 shows 200 pixels, which is in the selected column 914 of the State Table object 905 in value row 912. Since there are 5 columns in the State Table object 905, the camera simulation can show 5 states of the wired properties. The number of columns in the State Table object 905 can vary depending on the application and is not particularly limited.

In this example, the left aperture button 950 and the right aperture button 960 of the camera object 980 are buttons that can be used to change the state of the simulation. They act in this simulation as aperture buttons would act on a physical camera. An out "Click-start" property 952 in a message center 951 of the left aperture button 950 is wired to a "go back one step" control inlet 920 in the State Table object 905. When the left aperture button 950 is clicked, the State Table object 905 moves backward one column and changes the values of the wired properties accordingly. An out "Click-start" property 962 in a message center 961 of the right aperture button 960 is wired to a "go forward one step" control inlet 921 in the State Table object 905. When the right aperture button 960 is clicked, the State Table object 905 moves forward one column and changes the values of the wired properties accordingly.

While a Timeline is not used in this example, in other embodiments a Timeline could be used to present a sequence of all five states sequentially.

In some embodiments, when this simulation is run, the message centers, wires and the State Table object 905 are hidden to the user (not shown). The user is directly controlling the camera and seeing results. However, in other embodiments, when this simulation is run, the message centers, wires and the State Table object 905 are visible to the user (not shown).

FIG. 10 is a schematic diagram of a computer system 2300. The system 2300 can be used for the operations described in association with any of the computer-implement methods described herein. The system 2300 can include various forms of digital computers, such as laptops, desktops, workstations, personal digital assistants, servers, blade servers, mainframes, and other appropriate computers. The system 2300 can also include mobile devices, such as personal digital assistants, cellular telephones, smartphones, and other similar computing devices. Additionally the system 2300 can include portable storage media, such as, Universal Serial Bus (USB) Flash drives. For example, the USB Flash drives may store operating systems and other applications. The USB Flash drives can include input/output components, such as a wireless transmitter or USB connector that may be inserted into a USB port of another computing device.

In this example, the system 2300 includes a processor 2310, a memory 2320, a storage device 2330, and an input/output device 2340. Each of the components 2310, 2320, 2330, and 2340 are interconnected using a system bus 2350. The processor 2310 is capable of processing instructions for execution within the system 2300. The processor 2310 may be designed using any of a number of architectures. For example, the processor 2310 may be a CISC (Complex Instruction Set Computers) processor, a RISC (Reduced Instruction Set Computer) processor, or a MISC (Minimal Instruction Set Computer) processor.

In some implementations, the processor 2310 is a single-threaded processor. In some implementations, the processor 2310 is a multi-threaded processor. The processor 2310 is capable of processing instructions stored in the memory 2320 or on the storage device 2330 to display graphical information for a user interface on the input/output device 2340.

The memory 2320 stores information within the system 2300. In some implementations, the memory 2320 is a computer-readable medium. In some implementations, the memory 2320 is a volatile memory unit. In some implementations, the memory 2320 is a non-volatile memory unit.

The storage device 2330 is capable of providing mass storage for the system 2300. In some implementations, the storage device 2330 is a computer-readable medium. For example, the storage device 2330 may be a floppy disk device, a hard disk device, an optical disk device, or a tape device.

The input/output device 2340 provides input/output operations for the system 2300. In some implementations, the input/output device 2340 includes an input device (such as a keyboard, a pointing device such as a mouse or a trackball; a touch screen; a finger gesture device; etc.). In some implementations, the input/output device 2340 includes a display unit for displaying graphical user interfaces.

The features described herein can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and Flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features described herein can be implemented on a computer having a display device such as a CRT (cathode ray tube) or LCD (liquid crystal display) monitor for displaying information to the user and an input device (such as a keyboard; a pointing device such as a mouse or a trackball; a touch screen; a finger-gesture device; etc.) by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network. The relationship of client and server arises by virtue of computer programs running on the respective computers and having a client-server relationship to each other.

One of the advantages of the disclosed method is that assets can be replaced directly from the desktop of an operating system. Moreover, assets can be replaced in a plurality of objects without replacing them one by one as is the case with traditional authoring programs. Even further, assets can be replaced without the use of pull-down menus. As such, the disclosed method allows an asset in a plurality of objects to be replaced efficiently.

While the disclosed system and method have been described in conjunction with a preferred embodiment, it will be obvious to one skilled in the art that other objects and refinements of the disclosed system and method may be made within the purview and scope of the disclosure.

The disclosure, in its various aspects and disclosed forms, is well adapted to the attainment of the stated objects and advantages of others. The disclosed details are not to be taken as limitations on the claims.

Aspects:
1. A non-transitory computer-readable medium having computer executable instructions stored thereon for a computer apparatus to execute a method of associating a plurality of program objects using a logic table as a program object in a graphical user interface (GUI) system, the GUI system being implemented by a combined programming and running implementation that interacts with a multimedia computer application, the combined programming and running implementation being provided on the computer apparatus that includes a database and an image display, the GUI system being displayed on the image display, the method comprising:

displaying a first program object, a second program object and the logic table in the GUI system by the combined programming and running implementation accessing the first program object, the second program object and the logic table from an object library stored in the database, modifying a multimedia computer application and storing the modified multimedia computer application in the database;

linking a property of the first program object as an input to the logic table by the combined programming and running implementation further modifying the multimedia computer application and storing the further modified multimedia computer application in the database;

linking the property of the first program object to a property state of the logic table by the combined programming and running implementation further modifying the multimedia computer application and storing the further modified multimedia computer application in the database, the property state including a value statement, the property of the first program object being linked to the value statement, and the property state being linked to a numerical value property of the logic table as an output;

either one of (1) linking the numerical value property of the logic table as the output to a property of the second program object, or (2) linking the numerical value property of the second program object to the output, by the combined programming and running implementation further modifying the multimedia computer application and storing the further modified multimedia computer application in the database, thereby linking the property of the first program object and the property of the second program object through the logic table.

2. The computer-readable medium of aspect 1, wherein the value statement is a true or false statement.
3. The computer-readable medium of any of aspects 1 and 2, wherein the value statement is an alphanumerical statement.
4. The computer-readable medium of any of aspects 1-3, further comprising evaluating the property of the first program object based on an evaluation expression, and linking the property of the first program object to the value statement based on the evaluation.
5. The computer-readable medium of any of aspects 1-4, wherein a program object other than the first program object is linked as the input, the property state includes a plurality of value statements where one of the value statements is linked to a property of the program object other than the first program object that is linked as the input, and the evaluation expression references the property of the program object other than the first program object that is linked as the input, and the evaluation is based on the reference to the property of the program object other than the first program object that is linked as the input.
6. The computer-readable medium of any of aspects 1-5, wherein the logic table includes an input port and an output port for linking the properties of the program objects.
7. The computer-readable medium of any of aspects 1-6, wherein the logic table includes a value property port for linking the value statements.
8. The computer-readable medium of any of aspects 1-7, wherein the logic table includes an out wire bay for collecting a plurality of links.
9. The computer-readable medium of any of aspects 1-8, wherein the logic table includes a play control, wherein the play control allows a user to move from one property state to another property state.
10. The computer-readable medium of any of aspects 1-9, wherein the logic table includes a tween bar to manipulate the transition between one property state to another property state.
11. A non-transitory computer-readable medium having computer executable instructions stored thereon for a computer apparatus to execute a method of associating a plurality of program objects using a logic table as a program object in a graphical user interface (GUI) system, the GUI system being implemented by a combined programming and running implementation that interacts with a multimedia computer application, the combined programming and running implementation being provided on the computer apparatus that includes a database and an image display, the GUI system being displayed on the image display, the method comprising:

displaying a plurality of program objects and a logic table in the GUI system by the combined programming and running implementation accessing the plurality of program objects and the logic table from a database structure that includes an object library in the database, and modifying the multimedia computer application;

linking a property of each of the program objects as respective inputs to the logic table by the combined programming and running implementation further modifying the multimedia computer application and storing the modified computer application;

linking each of the properties of the program objects to a property state of the logic table by the combined programming and running implementation further modifying the multimedia computer application and storing the modified computer application, the property state including a plurality of value statements, the properties of the plurality of program objects being linked to each of the respective value statements, the plurality of value statements being arranged sequentially in the property state, and at least one sequential arrangement of the value statements being linked to a numerical value property of the logic table as an output, the at least one sequential arrangement of the value statements also being linked to an answer;

either one of (1) linking the numerical value property of the logic table as the output to a property of another program object or (2) linking a numerical value property of another program object to the output, by the combined programming and running implementation further modifying the multimedia computer application and storing the further modified multimedia computer application.

12. The computer-readable medium of aspect 7, wherein the logic table includes a plurality of property states and a plurality of answers, and each of the property states are linked to one of the answers.

13. A non-transitory computer-readable medium having computer executable instructions stored thereon for a computer apparatus to execute a method of associating a plurality of program objects using a logic table as a program object in a graphical user interface (GUI) system, the GUI system being implemented by a combined programming and running implementation that interacts with a multimedia computer application, the combined programming and running implementation being provided on the computer apparatus that includes a database and an image display, the GUI system being displayed on the image display, the method comprising:

displaying a first program object, a second program object and a logic table in the GUI system by the combined programming and running implementation accessing the first program object, the second program object and the logic table from an object library in the database, and modifying the multimedia computer application;

linking a property of a first program object to the logic table by the combined programming and running implementation further modifying the multimedia computer application and storing the modified computer application in the database, the logic table including a plurality of property states, the property of the first program object being such that the first program object is capable of switching from one property state to another property state in the logic table;

linking the property of the first program object to one of the property states of the logic table by the combined programming and running implementation further modifying the multimedia computer application and storing the modified multimedia computer application in the database, each of the property states including a value statement, each of the property state being linked to a numerical value property of the logic table as an output;

either one of (1) linking the numerical value property of the logic table as the output to a property of the second program object or (2) linking the numerical value property of the second program object to the output by the combined programming and running implementation further modifying the multimedia computer application and storing the modified multimedia computer application in the database, the value statement contained in each of the property states defining the property of the second program object.

14. A computer apparatus comprising a computer-readable medium with program instructions when executed by a processor to process and display a plurality of images on an image display, and a control unit adapted to execute a method of associating a plurality of program objects using a logic table as a program object in a graphical user interface (GUI) system, the GUI system being implemented by a combined programming and running implementation that interacts with a multimedia computer application, the combined programming and running implementation being provided on the computer apparatus that includes a database and an image display, the GUI system being displayed on the image display, the method comprising:

displaying a first program object, a second program object and the logic table in the GUI system by the combined programming and running implementation accessing the first program object, the second program object and the logic table from an object library stored in the database, modifying a multimedia computer application and storing the modified multimedia computer application in the database;

linking a property of the first program object as an input to the logic table by the combined programming and running implementation further modifying the multimedia computer application and storing the further modified multimedia computer application in the database;

linking the property of the first program object to a property state of the logic table by the combined programming and running implementation further modifying the multimedia computer application and storing the further modified multimedia computer application in the database, the property state including a value statement, the property of the first program object being linked to the value statement, and the property state being linked to a numerical value property of the logic table as an output;

either one of (1) linking the numerical value property of the logic table as the output to a property of the second program object, or (2) linking the numerical value property of the second program object to the output, by the combined programming and running implementation further modifying the multimedia computer application and storing the further modified multimedia computer application in the database, thereby linking the property of the first program object and the property of the second program object through the logic table.

15. A computer apparatus comprising a computer-readable medium with program instructions when executed by a processor to process and display a plurality of images on an image display, and a control unit adapted to execute a method of associating a plurality of program objects using a logic table as a program object in a graphical user interface (GUI) system, the GUI system being implemented by a combined programming and running implementation that interacts with a multimedia computer application, the combined programming and running implementation being provided on the computer apparatus that includes a database and an image display, the GUI system being displayed on the image display, the method comprising:

displaying a plurality of program objects and a logic table in the GUI system by the combined programming and running implementation accessing the plurality of program objects and the logic table from a database structure that includes an object library in the database, and modifying the multimedia computer application;

linking a property of each of the program objects as respective inputs to the logic table by the combined programming and running implementation further modifying the multimedia computer application and storing the modified computer application;

linking each of the properties of the program objects to a property state of the logic table by the combined programming and running implementation further modifying the multimedia computer application and storing the modified computer application, the property state including a plurality of value statements, the properties of the plurality of program objects being linked to each of the respective value statements, the plurality of value statements being arranged sequentially in the property state, and at least one sequential arrangement of the value statements being linked to a numerical value property of the logic table as an output, the at least one sequential arrangement of the value statements also being linked to an answer;

either one of (1) linking the numerical value property of the logic table as the output to a property of another program object or (2) linking a numerical value property of another program object to the output, by the combined programming and running implementation further modifying the multimedia computer application and storing the further modified multimedia computer application.

16. A computer apparatus comprising a computer-readable medium with program instructions when executed by a processor to process and display a plurality of images on an image display, and a control unit adapted to execute a method of associating a plurality of program objects using a logic table as a program object in a graphical user interface (GUI) system, the GUI system being implemented by a combined programming and running implementation that interacts with a multimedia computer application, the combined programming and running implementation being provided on the computer apparatus that includes a database and an image display, the GUI system being displayed on the image display, the method comprising:

displaying a first program object, a second program object and a logic table in the GUI system by the combined programming and running implementation accessing the first program object, the second program object and the logic table from an object library in the database, and modifying the multimedia computer application;

linking a property of a first program object to the logic table by the combined programming and running implementation further modifying the multimedia computer application and storing the modified computer application in the database, the logic table including a plurality of property states, the property of the first program object being such that the first program object is capable of switching from one property state to another property state in the logic table;

linking the property of the first program object to one of the property states of the logic table by the combined programming and running implementation further modifying the multimedia computer application and storing the modified multimedia computer application in the database, each of the property states including a value statement, each of the property state being linked to a numerical value property of the logic table as an output;

either one of (1) linking the numerical value property of the logic table as the output to a property of the second program object or (2) linking the numerical value property of the second program object to the output by the combined programming and running implementation further modifying the multimedia computer application and storing the modified multimedia computer application in the database, the value statement contained in each of the property states defining the property of the second program object.

17. A method of associating a plurality of program objects using a logic table as a program object in a graphical user interface (GUI) system, the GUI system being implemented by a combined programming and running implementation that interacts with a multimedia computer application, the combined programming and running implementation being provided on the computer apparatus that includes a database and an image display, the GUI system being displayed on the image display, the method comprising:

displaying a first program object, a second program object and the logic table in the GUI system by the combined programming and running implementation accessing the first program object, the second program object and the logic table from an object library stored in the database, modifying a multimedia computer application and storing the modified multimedia computer application in the database;

linking a property of the first program object as an input to the logic table by the combined programming and running implementation further modifying the multimedia computer application and storing the further modified multimedia computer application in the database;

linking the property of the first program object to a property state of the logic table by the combined programming and running implementation further modifying the multimedia computer application and storing the further modified multimedia computer application in the database, the property state including a value statement, the property of the first program object being linked to the value statement, and the property state being linked to a numerical value property of the logic table as an output;

either one of (1) linking the numerical value property of the logic table as the output to a property of the second program object, or (2) linking the numerical value property of the second program object to the output, by the combined programming and running implementation further modifying the multimedia computer application and storing the further modified multimedia computer application in the database, thereby linking the property of the first program object and the property of the second program object through the logic table.

18. A method of associating a plurality of program objects using a logic table as a program object in a graphical user interface (GUI) system, the GUI system being implemented by a combined programming and running implementation that interacts with a multimedia computer application, the combined programming and running implementation being provided on the computer apparatus that includes a database and an image display, the GUI system being displayed on the image display, the method comprising:

displaying a plurality of program objects and a logic table in the GUI system by the combined programming and running implementation accessing the plurality of program objects and the logic table from a database structure that includes an object library in the database, and modifying the multimedia computer application;

linking a property of each of the program objects as respective inputs to the logic table by the combined programming and running implementation further modifying the multimedia computer application and storing the modified computer application;

linking each of the properties of the program objects to a property state of the logic table by the combined programming and running implementation further modifying the multimedia computer application and storing the modified computer application, the property state including a plurality of value statements, the properties of the plurality of program objects being linked to each of the respective value statements, the plurality of value statements being arranged sequentially in the property state, and at least one sequential arrangement of the value statements being linked to a numerical value property of the logic table as an output, the at least one sequential arrangement of the value statements also being linked to an answer;

either one of (1) linking the numerical value property of the logic table as the output to a property of another program object or (2) linking a numerical value property of another program object to the output, by the combined programming and running implementation further modifying the multimedia computer application and storing the further modified multimedia computer application.

19. A method of associating a plurality of program objects using a logic table as a program object in a graphical user interface (GUI) system, the GUI system being implemented by a combined programming and running implementation that interacts with a multimedia computer application, the combined programming and running implementation being provided on the computer apparatus that includes a database and an image display, the GUI system being displayed on the image display, the method comprising:

displaying a first program object, a second program object and a logic table in the GUI system by the combined programming and running implementation accessing the first program object, the second program object and the logic table from an object library in the database, and modifying the multimedia computer application;

linking a property of a first program object to the logic table by the combined programming and running implementation further modifying the multimedia computer application and storing the modified computer application in the database, the logic table including a plurality of property states, the property of the first program object being such that the first program object is capable of switching from one property state to another property state in the logic table;

linking the property of the first program object to one of the property states of the logic table by the combined programming and running implementation further modifying the multimedia computer application and storing the modified multimedia computer application in the database, each of the property states including a value statement, each of the property state being linked to a numerical value property of the logic table as an output;

either one of (1) linking the numerical value property of the logic table as the output to a property of the second program object or (2) linking the numerical value property of the second program object to the output by the combined programming and running implementation further modifying the multimedia computer application and storing the modified multimedia computer application in the database, the value statement contained in each of the property states defining the property of the second program object.

What is claimed is:

1. A non-transitory computer-readable medium having computer executable instructions stored thereon, characterized in that the non-transitory computer-readable medium is configured for providing a logic table as a graphical object on an image display so that a user can implement the functions of the logic table without a user creating a source code, wherein the non-transitory computer-readable medium is further configured to allow a computer apparatus to execute a method of associating a plurality of program objects using the logic table as a program object in a graphical user interface (GUI) system, the GUI system being implemented by a combined programming and running implementation that interacts with a multimedia computer application, the combined programming and running implementation being provided on the computer apparatus that includes a database and an image display, the GUI system being displayed on the image display, the method comprising:

displaying a first program object, a second program object and the logic table in the GUI system by the combined programming and running implementation accessing the first program object, the second program object and the logic table from an object library stored in the database, modifying a multimedia computer application and storing the modified multimedia computer application in the database;

linking a property of the first program object as an input to the logic table by the combined programming and running implementation further modifying the multimedia computer application and storing the further modified multimedia computer application in the database;

linking the property of the first program object to a property state of the logic table by the combined programming and running implementation further modifying the multimedia computer application and storing the further modified multimedia computer application in the database, the property state including a value statement, the property of the first program object being linked to the value statement, and the property state being linked to a numerical value property of the logic table as an output;

either one of (1) linking the numerical value property of the logic table as the output to a property of the second program object, or (2) linking the numerical value property of the second program object to the output, by the combined programming and running implementation further modifying the multimedia computer application and storing the further modified multimedia computer application in the database, thereby linking the property of the first program object and the property of the second program object through the logic table.

2. The computer-readable medium of claim 1, wherein the value statement is a true or false statement.

3. The computer-readable medium of claim 1, wherein the value statement is an alphanumerical statement.

4. The computer-readable medium of any of claim 1, further comprising evaluating the property of the first program object based on an evaluation expression, and linking the property of the first program object to the value statement based on the evaluation.

5. The computer-readable medium of claim 1, wherein a program object other than the first program object is linked as the input, the property state includes a plurality of value statements where one of the value statements is linked to a property of the program object other than the first program object that is linked as the input, and the evaluation expression references the property of the program object other than the first program object that is linked as the input, and the evaluation is based on the reference to the property of the program object other than the first program object that is linked as the input.

6. The computer-readable medium of claim 1, wherein the logic table includes an input port and an output port for linking the properties of the program objects.

7. The computer-readable medium of claim 1, wherein the logic table includes a value property port for linking the value statements.

8. The computer-readable medium of claim 1, wherein the logic table includes an out wire bay for collecting a plurality of links.

9. The computer-readable medium of claim 1, wherein the logic table includes a play control, wherein the play control allows a user to move from one property state to another property state.

10. The computer-readable medium claim 1, wherein the logic table includes a tween bar to manipulate the transition between one property state to another property state.

* * * * *